(12) United States Patent
Miyata et al.

(10) Patent No.: US 9,736,235 B2
(45) Date of Patent: Aug. 15, 2017

(54) COMPUTER SYSTEM, COMPUTER, AND LOAD BALANCING METHOD

(71) Applicant: Hitachi, Ltd., Tokyo (JP)

(72) Inventors: Tatsuhiko Miyata, Tokyo (JP); Jun Yoshihara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 165 days.

(21) Appl. No.: 14/739,551

(22) Filed: Jun. 15, 2015

(65) Prior Publication Data

US 2016/0065660 A1 Mar. 3, 2016

(30) Foreign Application Priority Data

Sep. 2, 2014 (JP) .................. 2014-178100

(51) Int. Cl.
*G06F 15/173* (2006.01)
*H04L 29/08* (2006.01)

(52) U.S. Cl.
CPC ...... *H04L 67/1029* (2013.01); *H04L 67/1008* (2013.01); *H04L 67/1023* (2013.01)

(58) Field of Classification Search
None
See application file for complete search history.

(56) References Cited

U.S. PATENT DOCUMENTS

| | | | | |
|---|---|---|---|---|
| 7,805,407 B1* | 9/2010 | Verbeke | .............. | G06F 11/2097 707/634 |
| 8,676,994 B2* | 3/2014 | Manapragada | ..... | H04L 67/1008 709/223 |
| 2002/0010783 A1* | 1/2002 | Primak | .................. | G06F 9/505 709/228 |
| 2003/0014526 A1* | 1/2003 | Pullara | .................... | H04L 29/06 709/227 |
| 2006/0047751 A1* | 3/2006 | Chen | .................... | H04L 47/125 709/205 |
| 2013/0326044 A1* | 12/2013 | Maldaner | ................ | H04L 41/00 709/223 |

FOREIGN PATENT DOCUMENTS

JP 2006-338624 A 12/2006
JP 2010-009449 A 1/2010

* cited by examiner

*Primary Examiner* — Joshua Joo

(74) *Attorney, Agent, or Firm* — Volpe and Koenig, P.C.

(57) ABSTRACT

It is provided a computer system, comprising a plurality of computers configured to execute processing in response to requests received from a plurality of external systems. The plurality of computers each share an acceptance weight statistic value calculated by each of the plurality of computers with another computer within the same network segment. The processor of each of the plurality of computers is configured to: receive a broadcast transmitted from one of the plurality of external systems to the same network segment; determine whether to respond to the received broadcast by referring to the shared acceptance weight statistic value; and send a response to the one of the plurality of external systems that has transmitted the broadcast in order to allow the one of the plurality of external systems to transmit a processing request in a case where it is determined to respond to the received broadcast.

10 Claims, 22 Drawing Sheets

| SETTING ITEM | VALUE |
|---|---|
| NODE NAME | NODE0 |
| IP ADDRESS | 192.168.0.3 |
| PROCESSING REQUEST RECEPTION PORT NUMBER | 33321 |
| ACCEPTANCE WEIGHT STATISTIC VALUE | 782 |
| CURRENT ACCEPTANCE WEIGHT VALUE | 7 |
| CURRENT ACCEPTABILITY STATUS | CAN BE ACCEPTED |
| IP ADDRESS OF STATUS NOTIFICATION NODE | 192.168.0.250 |
| ... | ... |

OWN-NODE MANAGEMENT TABLE

*Fig. 7A*

| SETTING ITEM | VALUE |
|---|---|
| NODE NAME | NODE0 |
| IP ADDRESS | 192.168.0.3 |
| PROCESSING REQUEST RECEPTION PORT NUMBER | 33321 |
| ACCEPTANCE WEIGHT STATISTIC VALUE | 0 |
| CURRENT ACCEPTANCE WEIGHT VALUE | 0 |
| CURRENT ACCEPTABILITY STATUS | CAN BE ACCEPTED |
| IP ADDRESS OF STATUS NOTIFICATION NODE | 192.168.0.250 |
| ... | ... |

OWN-NODE MANAGEMENT TABLE

*Fig. 7B*

| EXTERNAL SYSTEM | p1 | p2 | p3 | ... | TOTAL WEIGHT VALUE |
|---|---|---|---|---|---|
| 192.168.1.21 | 11 | 25 | 165 | | 302 |
| 192.168.1.25 | 2 | 2 | 1 | | 15 |
| 192.168.1.26 | 20 | 57 | 33 | | 358 |
| ⋮ | ⋮ | | | | |

TOTAL WEIGHT VALUES OBTAINED DURING 2014/06/24 13:21:15 – 14:21:14
PROCESSING COUNT MANAGEMENT TABLE

*Fig. 8*

| EXTERNAL SYSTEM | ACCEPTANCE WEIGHT STATISTIC VALUE |
|---|---|
| 192.168.1.21 | 233 |
| 192.168.1.25 | 60 |
| 192.168.1.26 | 489 |
| ⋮ | |

STATISTIC VALUES AT 2014/06/24 13:21:15
ACCEPTANCE WEIGHT STATISTIC VALUE MANAGEMENT TABLE

*Fig. 9A*

| 372 | 373 | 371-2 |
|---|---|---|
| EXTERNAL SYSTEM | ACCEPTANCE WEIGHT STATISTIC VALUE | 374 |
| 192.168.1.21 | 256 | |
| 192.168.1.25 | 45 | |
| 192.168.1.26 | 445 | |
| ⋮ | | |

STATISTIC VALUES AT 2014/06/24 14:21:15
ACCEPTANCE WEIGHT STATISTIC VALUE MANAGEMENT TABLE

*Fig. 9B*

| 142 | 143 | 144 | 67 |
|---|---|---|---|
| PROCESSING | MESSAGE | WEIGHTING FACTOR | 145 |
| p1 | msgP1 | 2 | 146 |
| p2 | msgP2 | 5 | |
| p3 | msgP3 | 1 | |
| ⋮ | ⋮ | ⋮ | |

EXECUTION PROCESSING MANAGEMENT TABLE

*Fig. 10*

| TRANSMISSION SOURCE | MESSAGE | PROCESSING | STATUS |
|---|---|---|---|
| 192.168.1.21 | msgP1 | P1 | UNDER PROCESSING |
| 192.168.1.22 | msgP1 | P2 | WAITING FOR PROCESSING |
| 192.168.1.21 | msgP2 | p3 | WAITING FOR PROCESSING |
| ... | ... | ... | ... |

PROCESSING REQUEST MANAGEMENT QUEUE

*Fig. 12*

| NODE NAME | IP ADDRESS | STATUS | ACCEPTANCE WEIGHT STATISTIC VALUE | ACCEPTABILITY STATUS | PROCESSING REQUEST PORT NUMBER | ... |
|---|---|---|---|---|---|---|
| Node 0 | 192.168.0.5 | ACTIVE | 2200 | CAN BE ACCEPTED | 33255 | → |
| Node 1 | 192.168.0.11 | INACTIVE | 430 | CAN BE ACCEPTED | 33255 | → |
| Node 3 | 192.168.0.25 | ACTIVE | 3221 | CANNOT BE ACCEPTED | 33255 | → |
| Node 4 | 192.168.0.33 | ACTIVE | 1022 | CAN BE ACCEPTED | 33255 | → |
| ⋮ | ⋮ | ⋮ | ⋮ | ⋮ | ⋮ | ⋮ |

OTHER-NODE MANAGEMENT TABLE

*Fig. 14A*

| NODE NAME | IP ADDRESS | STATUS | ACCEPTANCE WEIGHT STATISTIC VALUE | ACCEPTABILITY STATUS | PROCESSING REQUEST PORT NUMBER | ... |
|---|---|---|---|---|---|---|
| Node 2 | 192.168.0.11 | ACTIVE | 0 | CAN BE ACCEPTED | 33255 | → |
| Node n | 192.168.0.25 | ACTIVE | 0 | CAN BE ACCEPTED | 33255 | → |
| ⋮ | ⋮ | ⋮ | ⋮ | ⋮ | ⋮ | ⋮ |

EXAMPLE OF STATE OF TABLE AFTER Seq1
OTHER-NODE MANAGEMENT TABLE

*Fig. 14B*

RECEPTION SETTING MANAGEMENT TABLE

STATISTIC VALUES AT 2014/06/24 13:21:15
ACCEPTANCE WEIGHT STATISTIC VALUE MANAGEMENT TABLE

STATISTIC VALUES AT 2014/06/24 14:21:15
ACCEPTANCE WEIGHT STATISTIC VALUE MANAGEMENT TABLE

APPLICATION SERVER 1 — 401

| EXTERNAL SYSTEM | WEIGHT STATISTIC VALUE |
|---|---|
| 192.168.1.21 | 233 |
| 192.168.1.25 | 402 |
| 192.168.1.26 | 489 |
| ... | ... |
| TOTAL | 1124 |

411 (rows), 414 (total)

ACCEPTANCE WEIGHT STATISTIC VALUE MANAGEMENT TABLE

*Fig. 23A*

APPLICATION SERVER 2 — 402

| EXTERNAL SYSTEM | WEIGHT STATISTIC VALUE |
|---|---|
| 192.168.8.5 | 22 |
| 192.168.10.22 | 633 |
| 10.232.33.112 | 124 |
| ... | ... |
| TOTAL | 779 |

412 (rows), 415 (total)

ACCEPTANCE WEIGHT STATISTIC VALUE MANAGEMENT TABLE

*Fig. 23B*

APPLICATION SERVER n — 403

| EXTERNAL SYSTEM | WEIGHT STATISTIC VALUE |
|---|---|
| 192.111.193.3 | 8 |
| 132.33.45.75 | 10 |
| 43.57.193.238 | 701 |
| ... | ... |
| TOTAL | 719 |

413 (rows), 416 (total)

ACCEPTANCE WEIGHT STATISTIC VALUE MANAGEMENT TABLE

*Fig. 23C*

APPLICATION SERVER 1 — 421

| PROCESSING | NUMBER OF REQUESTS | WEIGHT |
|---|---|---|
| p1 | 15 | 30 |
| p2 | 90 | 450 |
| p3 | 455 | 455 |
| ⋮ | ⋮ | ⋮ |

431

ACCEPTANCE WEIGHT STATISTIC VALUE MANAGEMENT TABLE

*Fig. 24A*

APPLICATION SERVER 2 — 422

| PROCESSING | NUMBER OF REQUESTS | WEIGHT |
|---|---|---|
| p1 | 50 | 100 |
| p2 | 20 | 100 |
| p3 | 88 | 88 |
| ⋮ | ⋮ | ⋮ |

432

ACCEPTANCE WEIGHT STATISTIC VALUE MANAGEMENT TABLE

*Fig. 24B*

APPLICATION SERVER n — 423

| PROCESSING | NUMBER OF REQUESTS | WEIGHT |
|---|---|---|
| p1 | 55 | 110 |
| p2 | 65 | 325 |
| p3 | 44 | 44 |
| ⋮ | ⋮ | ⋮ |

433

ACCEPTANCE WEIGHT STATISTIC VALUE MANAGEMENT TABLE

*Fig. 24C*

COMPUTER SYSTEM, COMPUTER, AND LOAD BALANCING METHOD

CLAIM OF PRIORITY

The present application claims priority from Japanese patent application JP 2014-178100 filed on Sep. 2, 2014, the content of which is hereby incorporated by reference into this application.

BACKGROUND OF THE INVENTION

This invention relates to a computer, and more particularly, to a computer for executing an application.

<Architecture of Distributed Application Infrastructure>

In recent years, some distributed application servers have a fixed architecture exhibiting high reliability, which provides an alternate server by ACT-STANDBY in advance, in order to facilitate scaling out of server nodes and ensure redundancy. In addition, there is proposed an architecture in which nodes that are arranged in a distributed manner are monitored, a status notification node notifies other nodes of a status of each node, and the respective nodes grasp the status of each other, thus taking over a node in which a failure has occurred.

In JP 2006-338624 A, there is disclosed a server access control system as an implementation example of such a distributed application server. In the server access control system disclosed in JP 2006-338624 A, the same IPv6 anycast address and multicast address are implemented on all servers, and the anycast address is used for access from a terminal 1. In a case of determining that a file cannot be provided in response to a file request received from the terminal 1, the server transmits a content of the file request to another server by using the multicast address, and notifies the terminal 1 of, as routing information, a unicast address of a server from which a message indicating that the file can be provided is first received. After receiving the routing information, the terminal 1 transmits a message addressed to the anycast address by adding thereto an IPv6 extension header including the received unicast address as the routing information.

<Load Balancing/Redundancy Management Technology on a General Application Server>

In a general application server, the following two methods are primarily employed in a case where throughput is increased by scaling out in order to handle a large volume of request processing.

The first method is processing distribution using a load balancing apparatus. Specifically, the load balancing apparatus such as an L4SW or an L7SW is placed in a previous stage of an application server group. An external system transmits a processing request to an IP address of the load balancing apparatus. The load balancing apparatus that has received the processing request distributes the processing based on a status of each application server placed in a subsequent stage. In a case of scaling out the application server, an application server to be added is registered in the load balancing apparatus. The load balancing apparatus allocates the received processing request to the added application server, to thereby cause the added application server to receive the processing request.

The second method is management of an address of an application server using a name server. Specifically, the name server for managing IP addresses of the application server group is placed. The name server monitors the status of each application server. The external system queries the name server about the IP address of an application server before transmitting a processing request to the application server, and transmits the processing request to the IP address received in response thereto. In the case of scaling out the application server, the application server to be added is registered in the name server. The name server returns the IP address of the added application server in response to the query about the IP address received from the external system, to thereby cause the added application server to receive the processing request.

<Load Balancing Policy Employed on General Application Server>

In general, in a case where a plurality of application servers are arranged by introducing a load balancing technology, the following two methods are primarily employed in terms of to which server a request received from the external system is to be allocated.

The first method is round robin. Specifically, in this method, requests received from the external system are allocated to a plurality of application servers in order. The round robin allows the requests received from the external system to be allocated to the respective application servers uniformly.

The second method is a method of distributing the processing based on loads imposed on application servers. Information that can be acquired from a plurality of application servers, such as CPU loads, memory usage amounts, and network utilization bandwidths of the application servers, is used to transfer the processing request to an application server having a low load at present. This method allows the load to be efficiently distributed based on the current load statuses of the respective application servers (see, for example, JP 2010-9449 A).

SUMMARY OF THE INVENTION

In the load balancing using the above-mentioned related art, the load balancing apparatus or the name server needs to be introduced in the previous stage of the application server.

Normally, the number of application servers is increased along with an increase in the number of external systems or an increase in a processing request amount, but the load balancing apparatus or the name server becomes a bottleneck, and hence the number of the application servers to be increased reaches a limit. Further, by placing the load balancing apparatus or the name server, apparatus to be managed within a system increase in number, which increases a management cost.

In addition, with the technology disclosed in JP 2006-338624 A, in a case of determining that the file can be provided, the server transmits the requested file as a file transmission packet from a designated address to a terminal. In that case, the server creates and transmits the file transmission packet to which routing information, which enables a message addressed to an anycast address from the terminal to arrive at a unicast address of its own, is added as the IPv6 extension header (see paragraph [0028]). However, it is not determined whether the processing can be conducted in consideration of situations of other servers.

Further, in the load balancing using the related art, by using general load measurement values such as a CPU load status, a memory usage amount, and a utilization amount of a network bandwidth, it is possible to acquire statistic values of current load statuses of an entire server and past load statuses of the entire server. However, with information on the entire server and information on each server, it is difficult to predict the load status to be imposed on each server in the future, which cannot improve efficiency of the load balancing.

The representative one of inventions disclosed in this application is outlined as follows. There is provided a computer system, comprising a plurality of computers configured to execute processing in response to requests received from a plurality of external systems. The plurality of computers each comprise a memory, a processor configured to access to the memory, and a network interface for communicating to/from another computer. The plurality of computers each share an acceptance weight statistic value calculated by each of the plurality of computers with another computer within the same network segment. The processor of each of the plurality of computers is configured to: receive a broadcast transmitted from one of the plurality of external systems to the same network segment; determine whether to respond to the received broadcast by referring to the shared acceptance weight statistic value; and send a response to the one of the plurality of external systems that has transmitted the broadcast in order to allow the one of the plurality of external systems to transmit a processing request in a case where it is determined to respond to the received broadcast.

According to the representative embodiment of this invention, loads imposed on computers can be distributed with a simple configuration. Objects, configurations, and effects other than those described above become apparent from the following description of one embodiment of the present invention.

BRIEF DESCRIPTION OF THE DRAWINGS

The present invention can be appreciated by the description which follows in conjunction with the following figures, wherein:

FIGS. 7A and 7B are diagrams illustrating examples of a configuration of the own-node management table according to the first embodiment;

FIG. 8 is a diagram illustrating an example of a configuration of the processing count management table according to the first embodiment;

FIGS. 9A and 9B are diagrams illustrating examples of a configuration of the acceptance weight statistic value management table according to the first embodiment;

FIG. 10 is a diagram illustrating an example of a configuration of the execution processing management table according to the first embodiment;

FIG. 12 an example of a configuration of the processing request management queue according to the first embodiment;

FIGS. 14A and 14B illustrate examples of a configuration of the other-node management table according to the first embodiment;

FIGS. 23A to 23C are diagrams illustrating examples of an acceptance weight statistic value management table according to the first embodiment; and FIGS. 24A to 24C are diagram illustrating examples of an acceptance weight statistic value management table according to the first embodiment.

DETAILED DESCRIPTION OF THE PREFERRED EMBODIMENT

Figure 1:
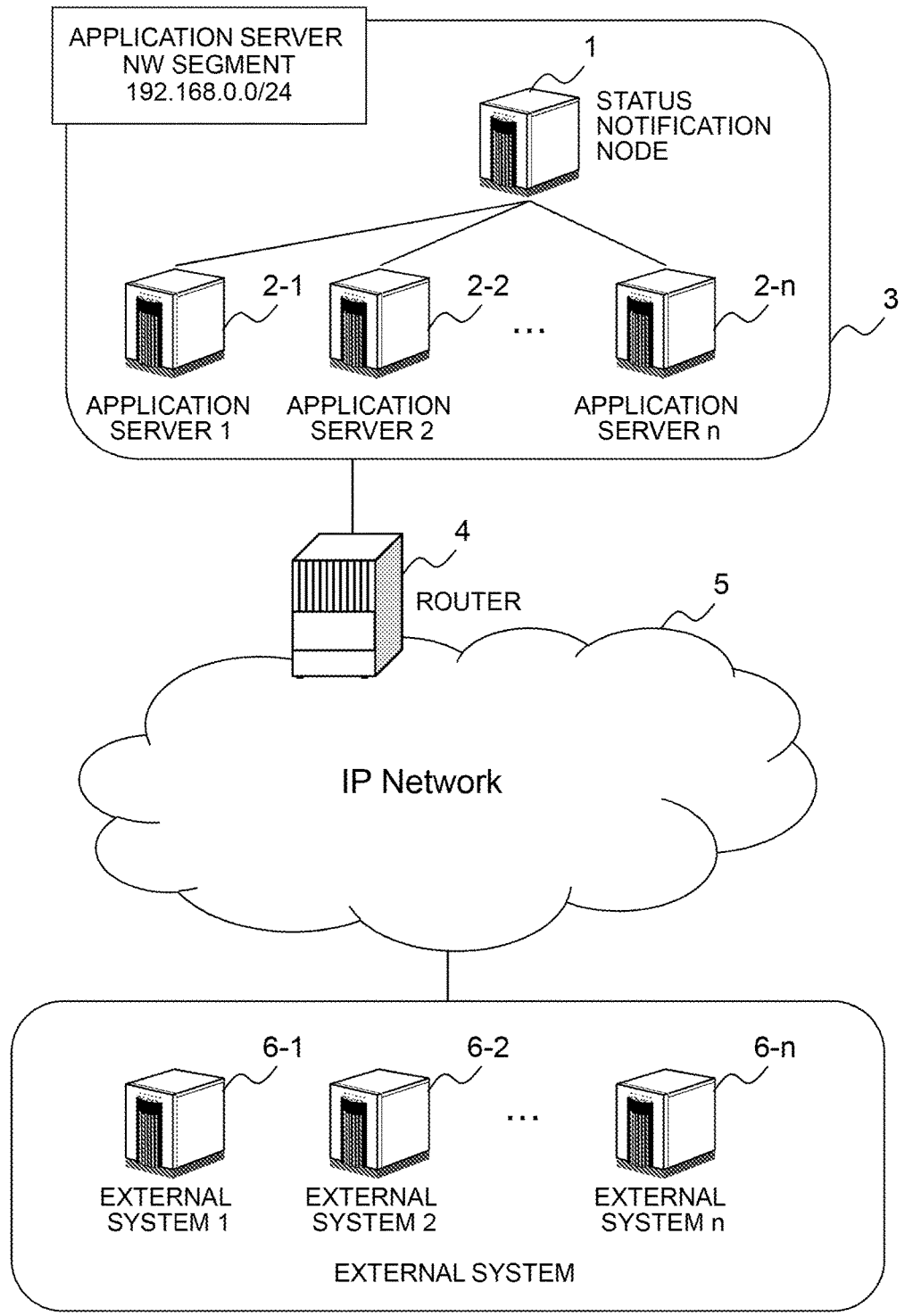
FIG. 1 is a diagram illustrating an outline of a network according to a first embodiment of the invention.

FIG. 1 is a diagram illustrating an outline of a network for coupling between an application server 2 and an external system 6 for accessing the application server 2 according to a first embodiment of the invention.

First, with reference to FIG. 1, a description is made of an outline of a network for terminal-server communications in regard to the application server 2 (distributed node) according to this embodiment and the outline of the network between the application server 2 and the node. An application server 2-1 to an application server n (2-n) have IP addresses within the same network segment, and are coupled to one another within one segment under a router 4. Further, a status notification node 1 is provided within the network segment containing the application servers 2-1 to 2-n. A plurality of external systems 6-1 to 6-n transmit a processing request to each of the application servers 2-1 to 2-n via a network 5 and the router 4.

The network 5 may be an IP network using the TCP/IP protocol, but may be a network using another protocol.

Figure 2:
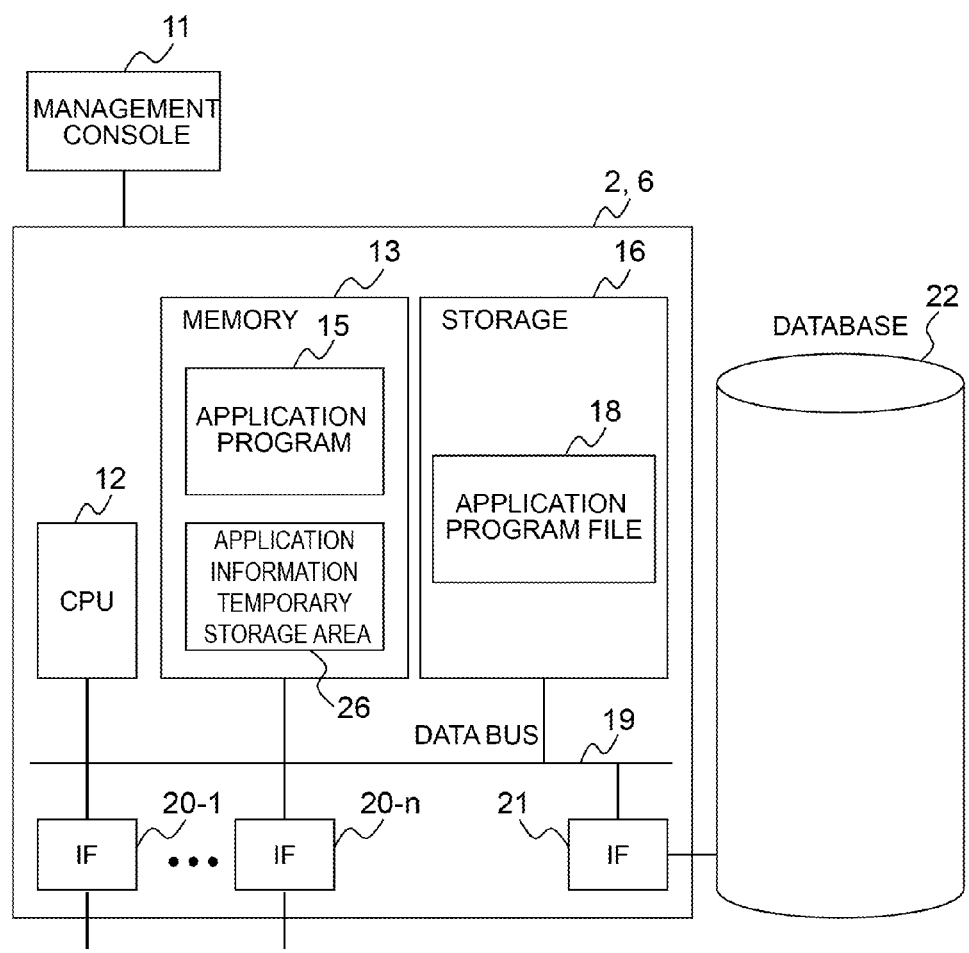
FIG. 2 is a block diagram illustrating a physical configuration of the application server and the external system according to the first embodiment.

FIG. 2 is a block diagram illustrating a physical configuration of the application server 2 and the external system 6 according to the first embodiment, and illustrates hardware for implementing functional blocks of each of the application server 2 and the external system 6 described later with reference to FIGS. 3 and 4.

The application server 2 and the external system 6 are each a computer including a CPU 12, a memory 13, a storage 16, and interfaces 20 and 21.

Figure 3:
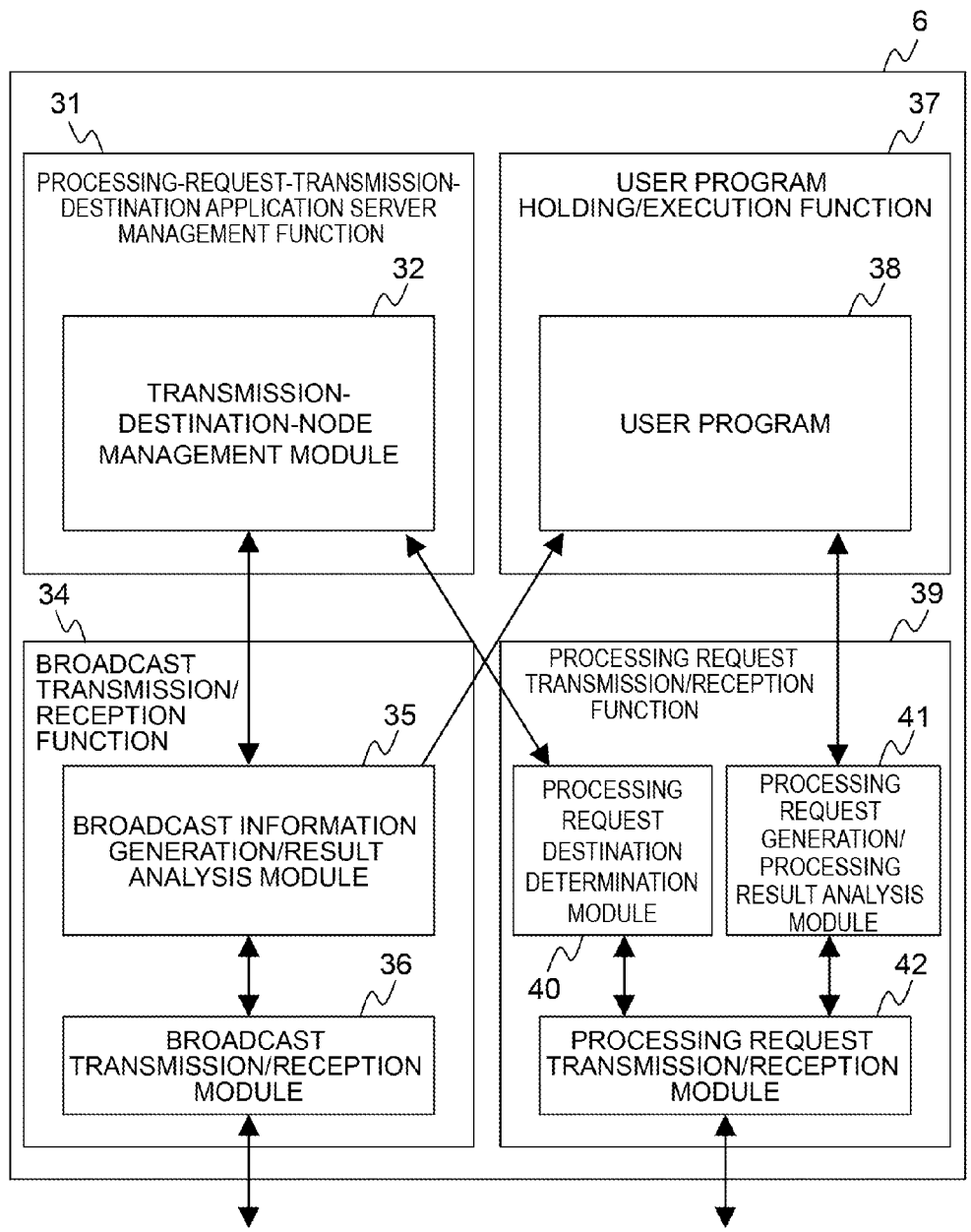
FIG. 3 is a functional block diagram of the external system according to the first embodiment.
Figure 4:
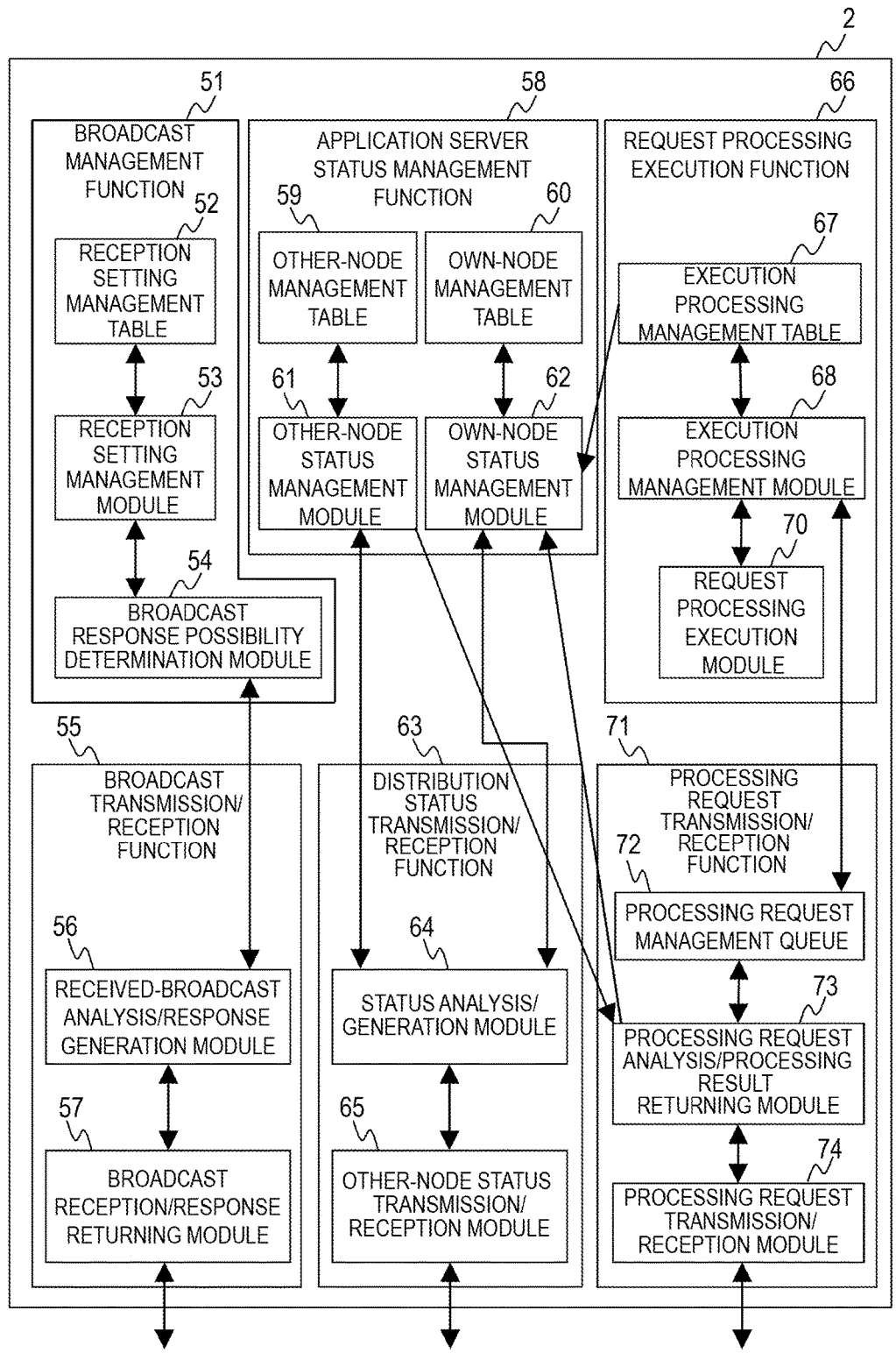
FIG. 4 is a functional block diagram of the application server according to the first embodiment.

From an application program 15 stored in the memory 13, the CPU 12 reads an operation procedure thereof to execute operations of various processing modules illustrated in FIGS. 3 and 4. The memory 13 temporarily stores a program stored in the storage 16 and data used when the program is executed. The storage 16 is, for example, a large-volume nonvolatile storage apparatus such as a magnetic storage apparatus or a flash memory, and stores the program executed by the CPU 12 and the data used when the program is executed. In other words, the application program 15 is generated when the program is started by copying an application program file 18 stored in the storage 16.

The program executed by the CPU 12 is provided to the computer through a removable medium (such as CD-ROM or flash memory) or a network, to be stored in the storage 16, which is a non-transitory storage medium. Therefore, the computer may include an interface for reading data from the removable medium.

A database 22 and an application information temporary storage area 26 on the memory 13 store information necessary when each processing module operates, and the CPU 12 reads and writes the information as necessary. Specifically, the CPU 12 reads and writes the data stored in the database 22 via the interface 21.

The database 22 is constructed of, for example, a large-volume nonvolatile storage apparatus such as a magnetic storage apparatus or a flash memory and a control system (for example, DBMS) for controlling input/output of the data of the storage apparatus. The database 22 and the application server 2 may be constructed of physically different apparatus, or may be constructed within one apparatus. Further, a part of the respective processing modules of the application server 2 and the external system 6 may be constructed as hardware instead of software. In addition, the external system 6 may include the database 22 as necessary or may not include the database 22.

The interface 20 is a network interface apparatus for controlling communications to/from another apparatus in accordance with a predetermined protocol. Further, the application server 2 and the external system 6 communicate to/from an apparatus located in a physically different position via the interface 20.

Each of the application server 2 and the external system 6 according to this embodiment is a computer system constructed on physically one computer or on a plurality of computers that are logically or physically constructed, and may operate in a separate thread on the same computer or may operate on a virtual machine built on a plurality of physical computer resources.

Next, an operation conducted until the external system 6 requests the application server 2 to conduct processing is described with reference to the functional block diagrams of FIGS. 3 and 4, sequential diagrams of FIGS. 15 and 16, a flowchart of processing of the external system 6 of FIG. 17, and flowcharts of processing of the application server 2 of FIGS. 18 and 19.

FIG. 3 is a functional block diagram of the external system 6 according to the first embodiment.

The external system 6 includes a processing-request-transmission-destination application server management function 31, a broadcast transmission/reception function 34, a user program holding/execution function 37, and a processing request transmission/reception function 39.

The processing-request-transmission-destination application server management function 31 is a functional block for managing transmission source information (such as an IP address and a transmission destination port number) on the application server 2 to which the external system 6 is to transmit the processing request and information (such as an IP address and a port number) on a broadcast transmission for identifying the application server 2.

The processing-request-transmission-destination application server management function 31 includes a transmission-destination-node management module 32. The transmission-destination-node management module 32 registers and deletes data in accordance with situations of communication to/from the application server 2. Specifically, when a broadcast transmission or a broadcast response is received, the transmission-destination-node management module 32 records the IP address and the port number of the application server 2. Further, when the processing request does not arrive at the application server 2, the transmission-destination-node management module 32 deletes the recorded IP address and port number.

The broadcast transmission/reception function 34 is a functional block for transmitting/receiving a broadcast for identifying the application server 2, and includes a broadcast information generation/result analysis module 35 and a broadcast transmission/reception module 36. The broadcast information generation/result analysis module 35 generates data on a broadcast to be transmitted, and analyzes data on the received broadcast response. The broadcast transmission/reception module 36 transmits a broadcast packet, and waits for a response.

The user program holding/execution function 37 is a functional block for holding and executing the program to be executed by the external system 6, and executes a user program 38 held therein as appropriate.

The processing request transmission/reception function 39 is a functional block for transmitting/receiving the processing request from the external systems 6 to the application server 2. The processing request transmission/reception function 39 includes a processing request destination determination module 40, a processing request generation/processing result analysis module 41, and a processing request transmission/reception module 42.

When receiving the processing request from the user program 38, which is to be transmitted to the application server 2, the processing request destination determination module 40 acquires the IP address and the port number of the application server 2 as the destination of the processing request from the transmission-destination-node management module 32. The processing request generation/processing result analysis module 41 creates data on the processing request to be transmitted and analyzes data on a received processing result response. The processing request transmission/reception module 42 transmits the processing request packet, and waits for the response.

FIG. 4 is a functional block diagram of the application server 2 according to the first embodiment.

The application server 2 includes a broadcast management function 51, a broadcast transmission/reception function 55, an application server status management function 58, a distribution status transmission/reception function 63, a request processing execution function 66, and a processing request transmission/reception function 71.

Figure 20:
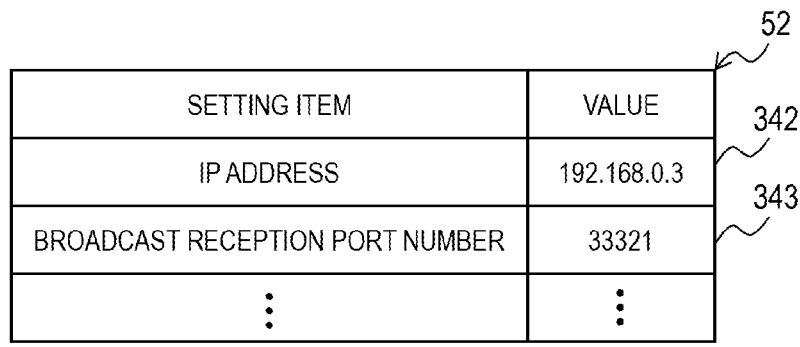
FIG. 20 is a diagram illustrating an example of a configuration of a reception setting management table according to the first embodiment.

The broadcast management function 51 is a functional block for determining whether to return a response to the broadcast received from the external system 6, and includes a reception setting management table 52, a reception setting management module 53, and a broadcast response possibility determination module 54. The reception setting management table 52 is a table for managing the port number waiting for the broadcast packet as illustrated in FIG. 20.

The reception setting management module 53 acquires data from the reception setting management table 52. The broadcast response possibility determination module 54 determines whether to respond to the broadcast received from the external system 6 based on the statuses of the own node and another node.

The broadcast transmission/reception function 55 is a functional block for receiving the broadcast from the external system 6 and returning the response to the received broadcast, and includes a received-broadcast analysis/response generation module 56 and a broadcast reception/response returning module 57. The received-broadcast analysis/response generation module 56 analyzes the data on the received broadcast packet, and generates data on the response to be returned to the received broadcast packet. The broadcast reception/response returning module 57 waits for the broadcast packet, and transmits a response packet to the broadcast packet.

The application server status management function 58 is a functional block for holding the status of another node and calculating and holding the status of the own node, and includes an other-node management table 59, an other-node status management module 61, an own-node management table 60, and an own-node status management module 62. The other-node management table 59 is a table for holding the status of another node as illustrated in FIG. 14A. Further, the other-node management table 59 includes a processing count management table 131 illustrated in FIG. 8 and an acceptance weight statistic value management table 371 illustrated in FIG. 9A, both of which are not illustrated in FIG. 4. The other-node status management module 61 inputs/outputs data on the other-node management table 59. The own-node management table 60 is a table for holding the status of the own node as illustrated in FIG. 7A. The own-node status management module 62 calculates the status of the own node based on the processing status of the own node, and holds the calculated status of the own node. Further, the own-node status management module 62 notifies another node of the status of the own node in a case where there is a change in the status of the own node.

The distribution status transmission/reception function 63 is a functional block for receiving the status of another node and notifying another node in a case where there is a change in the status of the own node, and includes a status analysis/generation module 64 and an other-node status transmission/reception module 65. The status analysis/generation module 64 analyzes data on the received status of the another node, and generates the data on the status of the own node to be transmitted. The other-node status transmission/reception module 65 waits for a status notification from another node, and transmits a notification packet for the status of the own node.

The request processing execution function 66 is a functional block for holding a processing module to be executed within the application server 2 and executing the processing in accordance with the request received from the external system 6, and includes an execution processing management table 67, an execution processing management module 68, and a request processing execution module 70. The execution processing management table 67 is a table for holding the processing to be executed as illustrated in FIG. 10. The execution processing management module 68 inputs/outputs information on the processing managed by the execution processing management table 67. The request processing execution module 70 acquires and executes a module for the processing corresponding to the processing request received from the external system 6.

The processing request transmission/reception function 71 is a functional block for receiving the processing request from the external system 6 and returning a processing result, and includes a processing request management queue 72, a processing request analysis/processing result returning module 73, and a processing request transmission/reception module 74. The processing request management queue 72 manages the statuses of a plurality of processing requests received from the external system 6 as illustrated in FIG. 12. Specifically, the processing request received from the external system 6 is queued in the processing request management queue 72, and when a processing response is returned, the corresponding processing request is deleted from the processing request management queue 72. The processing request analysis/processing result returning module 73 analyzes data on the received processing request, and generates data on a response to be returned. The processing request transmission/reception module 74 waits for the processing request packet received from the external system 6, and transmits the processing result response.

Next, a description is made of an operation conducted by the external system 6 requesting the application server 2 to conduct processing.

Figure 15:
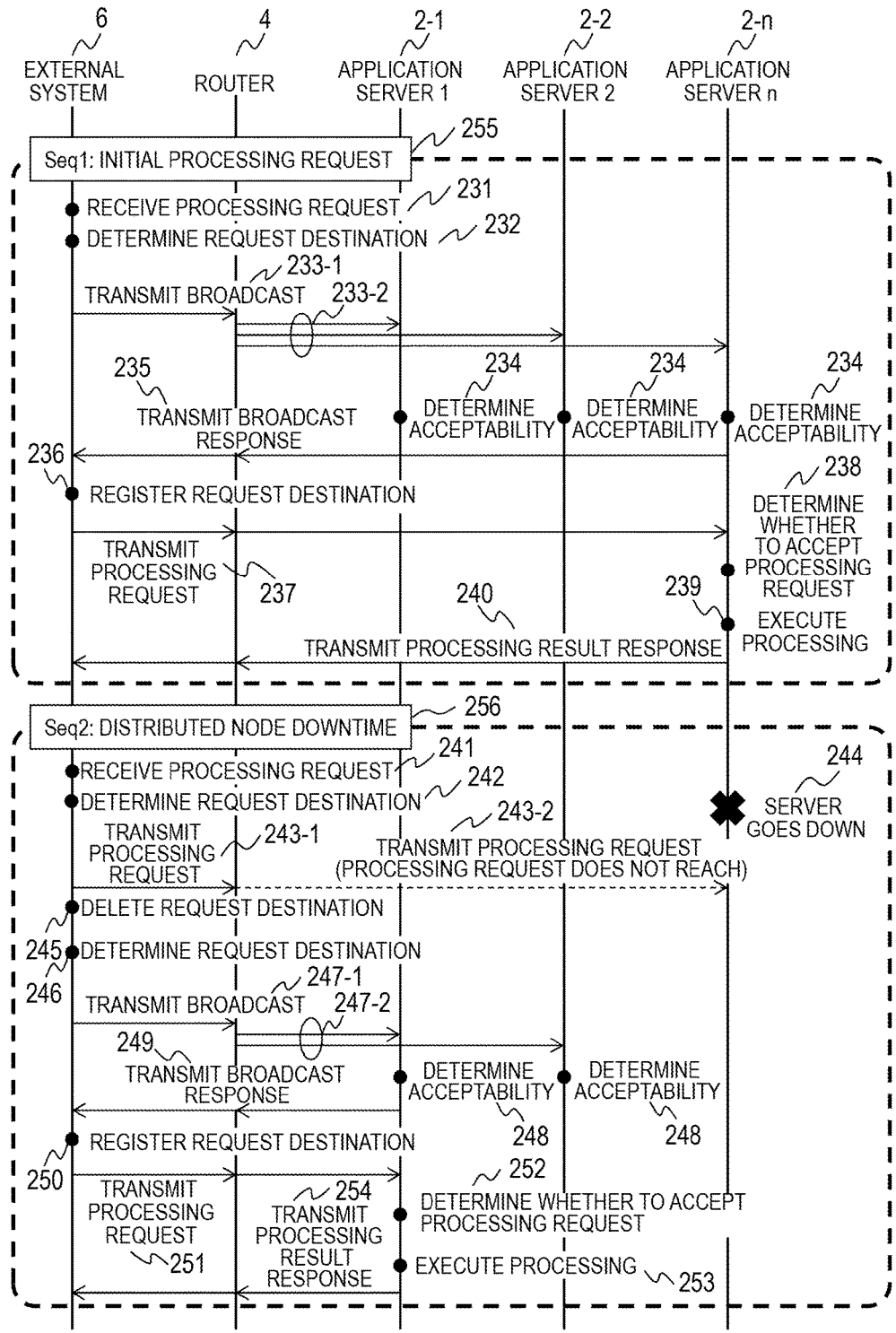
FIG. 15 is a diagram illustrating a sequence of processing according to the first embodiment.

First, in Step 255 of FIG. 15, a request indicating that the external system 6 is to transmit a processing request to the application server 2 is generated within the user program 38 illustrated in FIG. 3. Specifically, in a case of, for example, a Java program (Java is a registered trademark; the same applies hereinafter), a program library containing the processing-request-transmission-destination application server management function 31, the broadcast transmission/reception function 34, and the processing request transmission/reception function 39 illustrated in FIG. 3 is imported into the user program 38, which allows the program library to be referred to from the user program 38. Then, the request can be generated by calling a method of the imported library within the user program 38.

Figure 17:
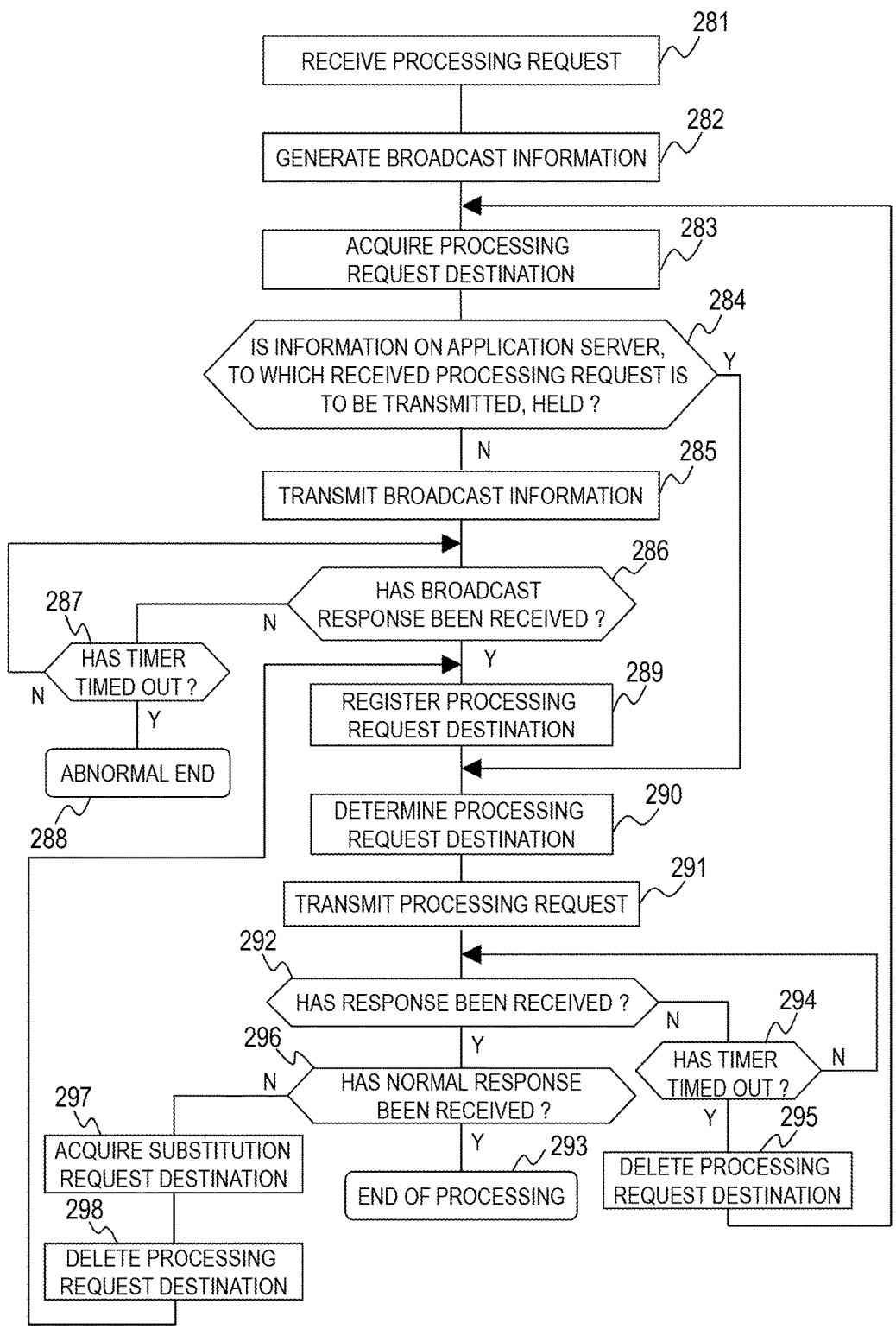
FIG. 17 is a flowchart illustrating processing executed by the processing request transmission/reception function according to the first embodiment.

FIG. 17 is a flowchart illustrating processing to be executed by the processing request transmission/reception function 39 after the generated processing request is received.

First, in a case where the processing request transmission/reception function 39 receives the processing request in Step 281, the processing request generation/processing result analysis module 41 generates a message of the processing request to be broadcast-transmitted to the application servers 2 (Step 282). Then, the processing request transmission/reception module 42 acquires a processing request destination via the processing request destination determination module 40 to store the processing request destination in the transmission-destination-node management module 32 (Step 283). The transmission-destination-node management module 32 determines whether information (for example, IP address) on the application server 2 to which the received processing request is to be transmitted is held therein (Step 284). In a case where the information on the application server 2 of the transmission destination is held, the procedure advances to Step 290 to determine the processing request destination and return the determined processing request destination to the processing request transmission/reception module 42 via the processing request destination determination module 40.

On the other hand, in a case where it is determined in Step 284 that the information on the application server 2 of the transmission destination is not held, a broadcast packet is transmitted to a broadcast IP address and a network port of the network segment in which the application server 2 exists (Step 285). The broadcast IP address and the network port of the network segment in which the application server 2 exists are held in the external system 6 in advance as a setting file. For example, as illustrated in FIG. 1, in a case where the network segment of the application server 2 is 192.168.0.0/ 24, the broadcast address is 192.168.0.255.

Seq1 of FIG. 15: an operation (transmission of the broadcast, transmission of the processing request, and normal reception of a result) of a normal system conducted by the external system 6 transmitting the processing request to the application server 2 is described with reference to the sequence of an initial processing request 255.

The above-mentioned processing of Step 284 corresponds to request destination determination of Step 232 of FIG. 15. After a broadcast packet 233-1 transmitted by the external system 6 is once received by the router 4, the router 4 transmits a broadcast packet 233-2 to all the IP addresses (application servers 2) within the network segment.

On each application server 2, the broadcast reception/response returning module 57 waits at the IP address and a reception port number that are set in the reception setting management table 52 in advance.

FIG. 20 illustrates an example of a configuration of the reception setting management table 52.

The reception setting management table 52 is a table for holding a value corresponding to a setting item, and is accessed by the reception setting management module 53. For example, an IP address is set in a record 342, and a reception port number is set in a record 343.

The port number of the broadcast packet transmitted by the external system 6 matches the port number (value of the record 343) for which the application server 2 waits, and hence the application server 2 receives the transmitted broadcast packet.

Subsequently, the application server 2 determines whether to accept the processing request (Step 234). This acceptability determination is described in detail with reference to FIG. 18.

Figure 18:
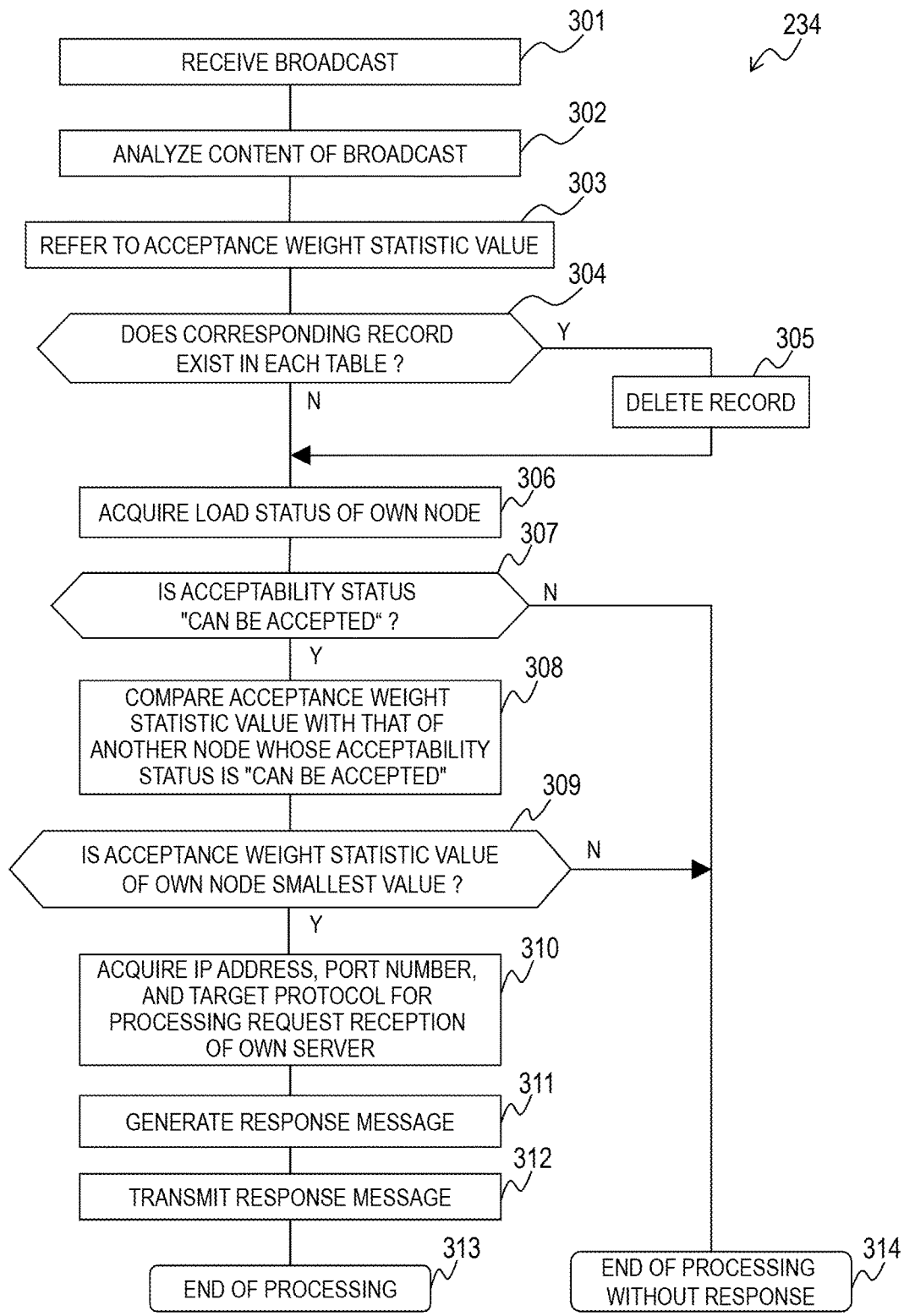
FIG. 18 is a flowchart illustrating acceptability determination processing according to the first embodiment.

FIG. 18 is a flowchart of acceptability determination processing.

First, on the application server 2, the broadcast reception/response returning module 57 receives the broadcast packet (Step 301).

Subsequently, the received-broadcast analysis/response generation module 56 analyzes a content of the broadcast packet, determines the external system 6 that has transmitted the broadcast packet based on the IP address of the received broadcast packet, and requests the broadcast response possibility determination module 54 to determine whether to respond to the broadcast packet (Step 302).

In a case of receiving the request for the determination, the broadcast response possibility determination module 54 accesses the application server status management function 58 to refer to the processing count management table 131 illustrated in FIG. 8 and the acceptance weight statistic value management table 371 illustrated in FIG. 9A within the application server status management function 58 (Step 303).

FIG. 8 illustrates an example of a configuration of the processing count management table 131.

The processing count management table 131 is a table for holding the number of processes for which processing requests have been accepted, and is accessed by the other-node status management module 61. The processing count management table 131 includes columns of an IP address 132 of an external system, processing 133 to processing 135, and a total weight value 136. In other words, the processing count management table 131 holds records in which the IP addresses of all the external systems 6 are recorded in the column 132. In other words, the processing count management table 131 holds as many records as the external systems 6 for which the processing requests are accepted during a summation period.

FIG. 9A and FIG. 9B illustrate examples of a configuration of the acceptance weight statistic value management table 371.

The acceptance weight statistic value management table 371 is a table for managing an acceptance weight statistic value of each external system 6, and is accessed by the other-node status management module 61. The acceptance weight statistic value management table 371 holds an acceptance weight statistic value 373 corresponding to an IP address 372 of the external system. In the same manner as the processing count management table 131, the acceptance weight statistic value management table 371 holds records in which the IP addresses of all the external systems 6 are recorded in the column 372. In other words, the acceptance weight statistic value management table 371 holds as many records as the external systems 6 for which the processing request is accepted during the summation period.

The description is resumed referring back to FIG. 18. The IP address of the external system 6 that has transmitted the received broadcast packet is compared with the IP address 132 recorded in the processing count management table 131 and the IP address 372 recorded in the acceptance weight statistic value management table 371, to thereby determine whether a record corresponding to the IP address of the external system 6 that has transmitted the broadcast packet exists in each table (Step 304).

In a case where the record exists in any one of the tables, the record is deleted from each of the tables (Step 305), and the procedure advances to Step 306. On the other hand, in a case where the record exists in none of the tables, the procedure advances to Step 306.

In Step 306, the broadcast response possibility determination module 54 refers to the own-node management table 60 via the own-node status management module 62 to acquire the load status of the own node.

FIG. 7A illustrates an example of a configuration of the own-node management table 60.

The own-node management table 60 is a table for managing the status of the own node based on a record obtained by associating a setting item 121 and a value 122 with each other, and is accessed by the own-node status management module 62. For example, a node name is set in a record 123, the IP address is set in a record 124, and a processing request reception port number is set in a record 125, the acceptance weight statistic value is set in a record 126, a current acceptance weight value is set in a record 127, a current acceptability status is set in a record 128, and the IP address of the status notification node 1 is set in a record 129.

For example, it is possible to learn the load status of the node based on the value of the current acceptability status of the record 128. In a case where the value of the record 128 is "can be accepted", a low load status that allows a process to be accepted is indicated. Further, in a case where the value of the record 128 is "cannot be accepted", a high load status that inhibits the process from being accepted is indicated.

The description is resumed referring back to FIG. 18. In Step 307, in a case where the value of the load status (current acceptability status of the record 128) acquired in Step 306 is "cannot be accepted", the procedure advances to Step 314 to bring the acceptability determination processing to an end without responding to the broadcast packet.

On the other hand, in a case where the value of the load status acquired in Step 306 is "can be accepted", the procedure advances to Step 308, in which the other-node management table 59 is referred to via the other-node status management module 61 to compare the acceptance weight statistic value of the own node with the acceptance weight statistic value of another node.

FIG. 14A illustrates an example of a configuration of the other-node management table 59.

The other-node management table 59 is a table for managing the status of another node, and is accessed by the other-node status management module 61. The other-node management table 59 includes columns of a node name 212, an IP address 213, a status 214, an acceptance weight statistic value 215, an acceptability status 216, and a processing request port number 217.

The node name 212 is a name of another node, and the IP address 213 is the IP address of the another node. The status 214 indicates whether the another node is currently active, and any one of "active" and "inactive" is recorded therein. The acceptance weight statistic value 215 is the acceptance weight statistic value of the another node. The acceptability status 216 indicates the current status of the another node, and any one of "can be accepted" and "cannot be accepted" is recorded therein.

The description is resumed referring back to FIG. 18. In Step 308, the node whose status 214 is "active" and whose acceptability status 216 is "can be accepted" is selected from among the records of the other-node management table 59, and the value of the acceptance weight statistic value 215 of the selected node is acquired. Then, the value of the acceptance weight statistic value 126 of the own node acquired from the own-node management table 60 in Step 306 is compared with the acquired acceptance weight statistic value of the another node. For example, the value of the record 127 indicating a total value of the acceptance weight statistic value of the own node is "782". Further, referring to the other-node management table 59, the acceptance weight statistic value of the record 218 is "2200", and the total value of the acceptance weight statistic value of the record 221 is "1022".

It should be noted that target nodes may be compared with each other in terms of the acceptance weight statistic value in units of the external system illustrated in FIG. 9A. Further, the target nodes may be compared with each other in terms of the acceptance weight statistic value for each processing illustrated in FIGS. 21A and 21B.

Subsequently, in Step 309, as a result of comparing the acceptance weight statistic value of the own node with the acceptance weight statistic value of the another node, it is determined whether the own node is to accept the request. Specifically, it is determined whether the acceptance weight statistic value of the own node is the smallest value. in a case where the acceptance weight statistic value of the own node is not the smallest value, the procedure advances to Step 314 to bring the acceptability determination processing to an end without responding to the broadcast packet. On the other hand, in a case where the acceptance weight statistic value of the own node is the smallest value, the procedure advances to Step 310. In the above-mentioned example, the acceptance weight statistic value of the own server is "782", while the acceptance weight statistic values of the other nodes are "2200" and "1022". Therefore, it is determined that the own node has the smallest value, and the procedure advances to Step 310.

Figure 21A:
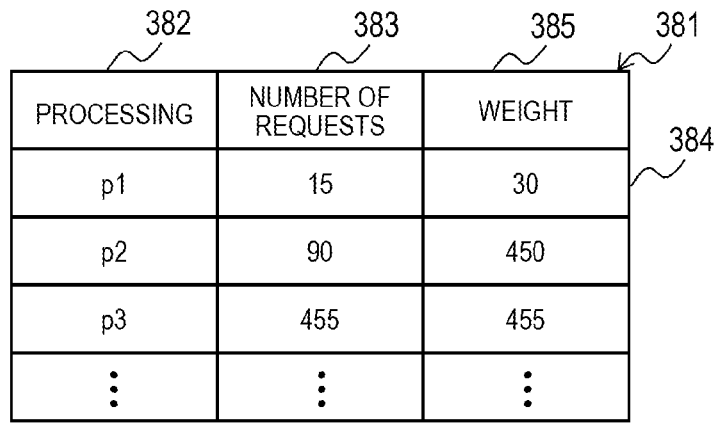
FIGS. 21A and 21B are diagrams illustrating examples of an acceptance weight statistic value management table according to the first embodiment.
Figure 21B:
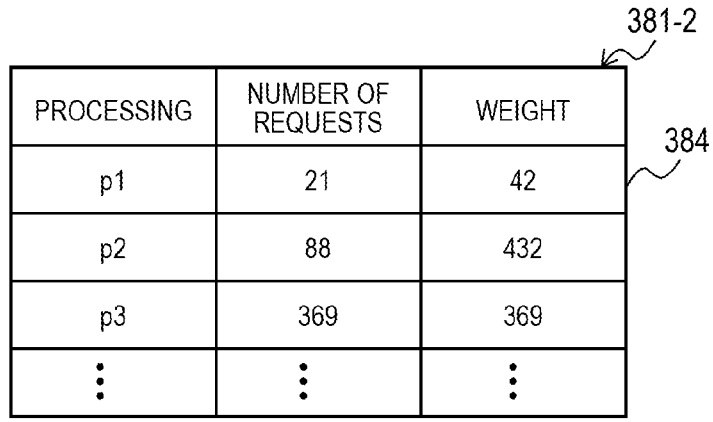

It should be noted that in Steps 308 and 309, the values of the acceptance weight statistic value 215 of the other-node management table 59 illustrated in FIGS. 14A and 14B are used for the comparison, but in order to conduct a finer comparison, the comparison may be conducted by using the acceptance weight statistic value for each external system managed by the acceptance weight statistic value management table illustrated in FIG. 9A that is shared by the respective nodes and by using the acceptance weight statistic value for each processing managed by the acceptance weight statistic value management table illustrated in FIG. 21A and FIG. 21B.

For example, in a case where the acceptance weight statistic value for each external system illustrated in FIGS. 23A to 23C is shared among the nodes, the weight statistic value of the external system 6 having the heaviest processing load is selected from the acceptance weight statistic value management table for the respective external systems of each node. Then, in Step 309, it may be determined that the node that is the smallest in the selected weight statistic value is to accept the request. In the example illustrated in FIGS. 23A to 23C, a record 411 of a table 401 regarding the application server 2-1, a record 412 of a table 402 regarding the application server 2, and a record 413 of a table 403 regarding the application server n are compared with one another. As a result, the weight statistic value "489" of the application server 2-1 is the smallest, and hence it is determined that the application server 2-1 is to accept the request. Further, the application servers 2 to n are not the smallest in the weight statistic value, and are therefore determined not to accept the request.

In the acceptance weight statistic value management table illustrated in FIGS. 23A to 23C, total values 414 to 416 of the acceptance weight statistic values of the respective application servers are "1124", "779", and "719", and hence it is possible to determine that the application server n is to accept the request in terms of the total value. However, in a case where importance is placed on a concentration ratio of loads imposed by the a specific external system 6, the application server n receives the processing request from the external system 6 having the IP address of 43.57.193.238 with high frequency, and the concentration ratio of access from one of the external systems 6 is higher than that of the application server 2-1.

Further, for example, in a case where the acceptance weight statistic value for each processing illustrated in FIGS. 24A to 24C is shared among the nodes, it may be determined in Step 309 that the node that is the smallest in the number of requests of the processing "p1" is to accept the processing. In the example illustrated in FIGS. 24A to 24C, a record 431 of a table 421 regarding the application server 2-1, a record 432 of a table 422 regarding the application server 2, and a record 433 of a table 423 regarding the application server n are compared with one another. As a result, the number "15" of requests of the application server 2-1 is the smallest, and hence it is determined that the application server 2-1 is to accept the request. Further, the application servers 2 to n are not the smallest in the number of requests, and are therefore determined not to accept the request.

In this manner, by changing a method of comparing the weights or a type of value to be compared, the determination can be conducted by using various elements in addition to the entire load imposed on the application server 2 that is to accept the processing request.

The description is resumed referring back to FIG. 18. In Step 310, the broadcast response possibility determination module 54 acquires response information from the own-node management table 60 via the own-node status management module 62 in order to respond to the broadcast packet.

Specifically, the node name 123, the IP address 124, and the processing request reception port number 125 are acquired from the own-node management table 60 illustrated in FIG. 7A. The broadcast response possibility determination module 54 transmits the acquired information to the received-broadcast analysis/response generation module 56.

Subsequently, the received-broadcast analysis/response generation module 56 generates a response message to the broadcast packet based on the received information (Step 311). Then, the broadcast reception/response returning module 57 returns the response to the IP address and the port number of the external system 6 of the transmission source (Step 312), and brings the acceptability determination processing to an end (Step 313).

The broadcast response packet returned in Step 312 arrives at the external system 6 via the router 4 (Step 235 of FIG. 15).

After transmitting the broadcast packet in Step 285 of FIG. 17, the external system 6 waits for a response to be received from the application server 2 by the broadcast transmission/reception module 36 (Step 286). In a case where the broadcast response has not been received, the procedure advances to Step 287 to determine whether a timer has timed out. A time period to be waited until the timeout is set in advance in the external system 6. Further, the external system 6 counts an elapsed time since the broadcast information is transmitted in Step 285. In a case where the counted elapsed time exceeds a timeout period set in advance, processing request transmission processing is brought to an abnormal end (Step 288).

Specifically, when detecting the timeout, the broadcast transmission/reception module 36 transmits the timeout to the broadcast information generation/result analysis module 35. The broadcast information generation/result analysis module 35 transmits the timeout to the user program 38. For example, in the case of the Java program, the broadcast information generation/result analysis module 35 throws the status of the timeout to the user program 38 as an exception. The user program 38 can detect the thrown timeout by creating a program for catching the exception.

In a case where the counted elapsed time has not exceeded the timeout period set in advance, the procedure returns to Step 286 to repeatedly determine whether the broadcast response has been received.

On the other hand, in a case where it is determined that the broadcast response has been received in Step 286, the procedure advances to Step 289. In Step 289, the transmission-destination-node management module 32 stores the content of the received broadcast response in the memory, to thereby register the processing request destination (Step 236 of FIG. 15). Then, the information on the received broadcast response is transmitted to the processing request destination determination module 40. The processing request destination determination module 40 determines the processing request destination (Step 290), and the processing request transmission/reception module 42 transmits the processing request to the determined processing request destination (Step 291).

The processing request transmitted by the external system 6 arrives at the application server 2 that has responded to the broadcast packet via the router 4 (Step 237 of FIG. 15).

Then, the application server 2 that has received the processing request determines whether to accept the processing request (Step 238), and executes the processing (Step 239). A description is made below of processing from processing request acceptance determination up to returning of a result of the executed processing.

Figure 19:
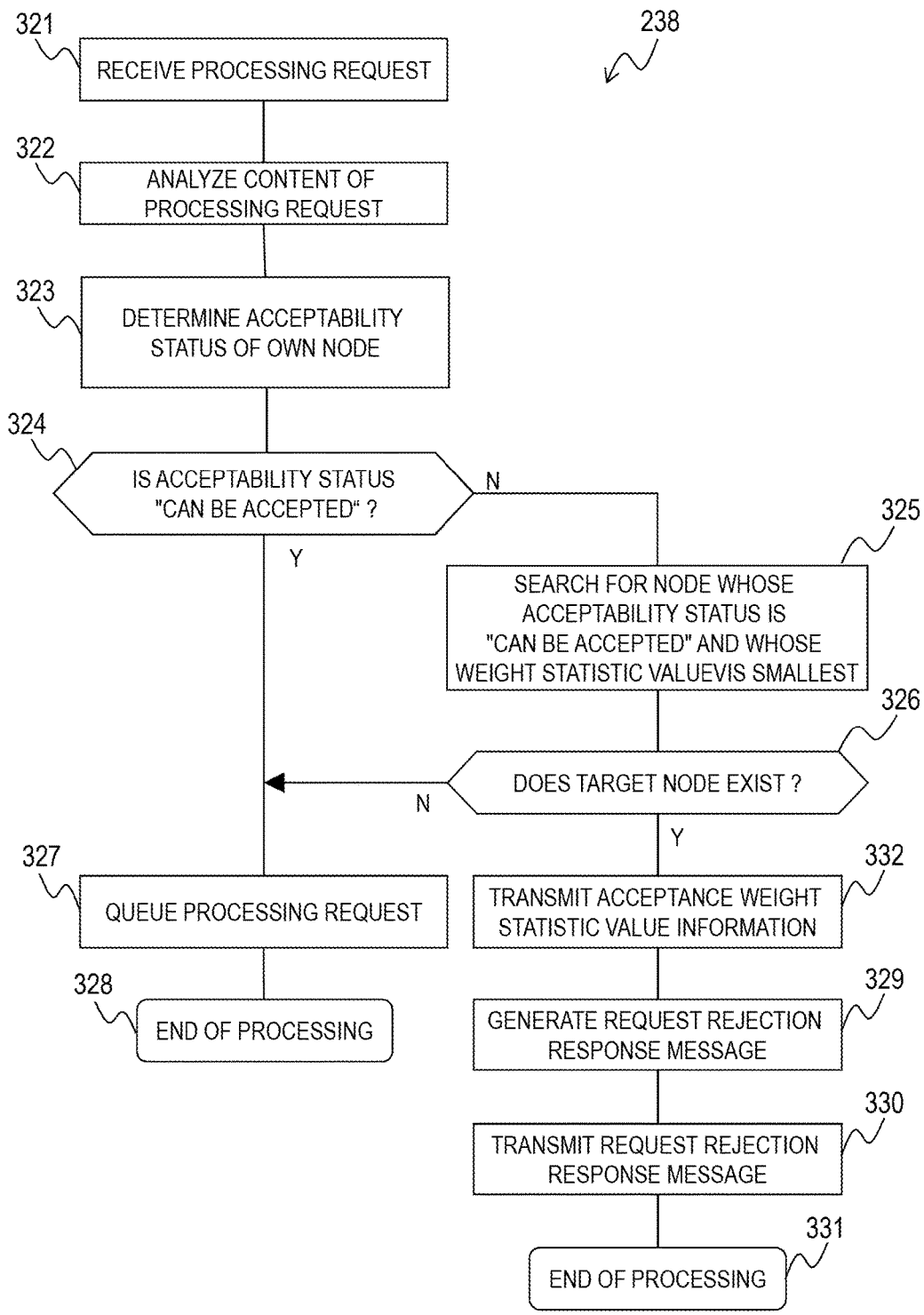
FIG. 19 is a flowchart illustrating details of the processing request reception processing.

FIG. 19 is a flowchart illustrating details of the processing of Steps 238 and 239 (processing request reception processing).

In a case where the processing request transmission/reception module 74 of the application server 2 receives the processing request (Step 321), the processing request analysis/processing result returning module 73 analyzes the content of the received processing request. Specifically, the processing request analysis/processing result returning module 73 refers to the execution processing management table 67 via the execution processing management module 68 to determine a kind of the received processing request and identify the processing corresponding to the message (Step 322).

FIG. 10 illustrates an example of a configuration of the execution processing management table 67.

The execution processing management table 67 is a table including columns of a processing 142, a message 143, and a weighting factor 144 of each processing, and is accessed by the execution processing management module 68. On the application server 2, the execution processing management table 67 is set before startup, and is deployed so that the processing module can be executed.

For example, in a case where the processing request to which a message "msgP1" is added is received from the external system 6, the content of the message is analyzed in Step 322, and the record of the execution processing management table 67 in which the processing 142 is "msgP1" is selected. In this example, a record 145 is selected. The message "msgP1" is a message managed by the application server 2, and the target processing is "p1", which allows the execution of the processing. On the other hand, in a case where a message whose record does not exist in the execution processing management table 67 is received, the processing cannot be executed on the application server 2, and hence an error response is returned to the external system 6.

The description is resumed referring back to FIG. 19. In a case where the analysis of the content of the processing request is finished normally in Step 322, the processing request analysis/processing result returning module 73 refers to the value of the acceptability status 128 of the own-node management table 60 illustrated in FIG. 7A via the own-node status management module 62, to determine the current acceptability of the own node (Step 323).

Subsequently, it is determined in Step 324 whether the value of the acceptability status of the own node is "can be accepted". In a case where the value of the acceptability status of the own node is "can be accepted", the procedure advances to Step 327 to store the processing request in the processing request management queue 72. After that, the processing request reception processing is brought to an end (Step 328).

The request processing execution module 70 sequentially acquires and processes the processing requests stored in the processing request management queue 72. The request processing execution module 70 transmits the processing result of the processing request acquired from the processing request management queue 72 to the processing request analysis/processing result returning module 73 via the processing request management queue 72. The processing request analysis/processing result returning module 73 generates response information based on the processing result, and the processing request transmission/reception module 74 returns the response to the external system 6.

The processing result response message returned from the application server 2 is transferred to the external system 6 via the router 4 (Step 240 of FIG. 15).

On the other hand, processing conducted in a case where it is determined in Step 324 that the value of the acceptability status of the own node is "cannot be accepted" is described later referring to a sequence Seq3 of FIG. 16: rejection of application server request acceptance (with a substitution request destination node being attached) 275.

After transmitting the processing request in Step 291 of FIG. 17, the external system 6 waits for the response to the processing request, and determines whether the response to the processing request has been received (Step 292). In a case where the response to the processing request has not been received, the external system 6 advances to Step 294 to determine whether the timer has timed out. The time period to be waited until the timeout is set in advance in the external system 6. Further, the external system 6 counts the elapsed time since the processing request is transmitted in Step 291. In a case where the counted elapsed time does not exceed the timeout period set in advance, the procedure returns to Step 292 to repeatedly determine whether the response to the processing request has been received.

On the other hand, in a case where the counted elapsed time exceeds the timeout period set in advance, the procedure advances to Step 295 to delete the information on the processing request destination because the information recorded in the memory as the processing request destination is invalid. This specific sequence is described later referring to a sequence Seq2 of FIG. 15: an application server downtime 256.

In a case where it is determined in Step 292 that the processing result has been received, it is determined whether the received response is normal (Step 296). In a case where the normal response is received, the received response (namely, processing result) is returned to the user program 38 via the processing request generation/processing result analysis module 41, and the processing request transmission processing is brought to an end (Step 293).

On the other hand, in a case where it is determined in Step 296 that a rejection response has been received, the information on an alternate application server 2 is acquired (Step 297), and the procedure returns to Step 289. This processing is described later in detail referring to the sequence Seq3 of FIG. 16: rejection of the application server request acceptance (with the substitution request destination node being attached) 275.

Next, with reference to the sequence Seq2 of FIG. 15: the application server downtime 256, a description is made of an operation for identifying the application server 2 that is to conduct the processing by broadcasting the processing request again because the processing request does not reach the application server 2 even after the external system 6 transmits the processing request to the application server 2. The processing within Seq2 from processing request reception (Step 241) and request destination determination (Step 242) up to processing request transmission (Step 243-1) is the same as the processing from the processing request reception (Step 231) up to the processing request transmission (Step 237) of the above-mentioned Seq1, and hence a description thereof is omitted.

For example, in a case where the application server 2-n identified as the processing request destination by the external system 6 goes down (Step 244), the processing request transmitted by the external system 6 does not reach the application server 2-n of the destination (Step 243). Therefore, it is determined that the timer has timed out in Step 294 of FIG. 17 described above. In this case, the information on the processing request destination registered in the memory is invalid, and hence the external system 6 deletes the information on the processing request destination (Step 295 of FIG. 17 and Step 245 of FIG. 15).

After that, the procedure returns to the Step 283 of FIG. 17 to determine the existence of the processing request destination again, but in Step 295, the information on the application server 2 previously determined as the processing request destination has already been deleted. Therefore, the determination of Step 284 is "N", and the broadcast information is transmitted again (Step 285). In other words, the request destination is determined in Step 246 of FIG. 15, and the broadcast packet is transmitted (Step 247-1). The subsequent sequence is the same as the sequence employed after the broadcast packet is transmitted in Step 233-1.

However, the application server 2-n is down, and hence the broadcast of Step 247-2 cannot be accepted. On the other hand, each application server 2 that has received the broadcast packet determines the acceptability in the same manner as in Step 234 (Step 248). The details of the determination processing are the same as those described above. In a case where it is determined in this acceptability determination 248 that the application server 2-1 is to accept the processing request, the broadcast response is transferred to the external system 6 (Step 249). The external system 6 registers the information on the application server 2-1 as a new processing request destination (Step 250), and transmits the processing request to the application server 2-1 (Step 251). In a case where receiving the processing request, the application server 2-1 determines whether to accept the processing request (Step 252), executes the processing (Step 253), and transmits the processing result response message. The processing result response message returned from the application server 2-1 is transferred to the external system 6 via the router 4 (Step 254).

With the above-mentioned processing, the sequence from the processing request up to the returning of the processing result is brought to an end.

Figure 16:
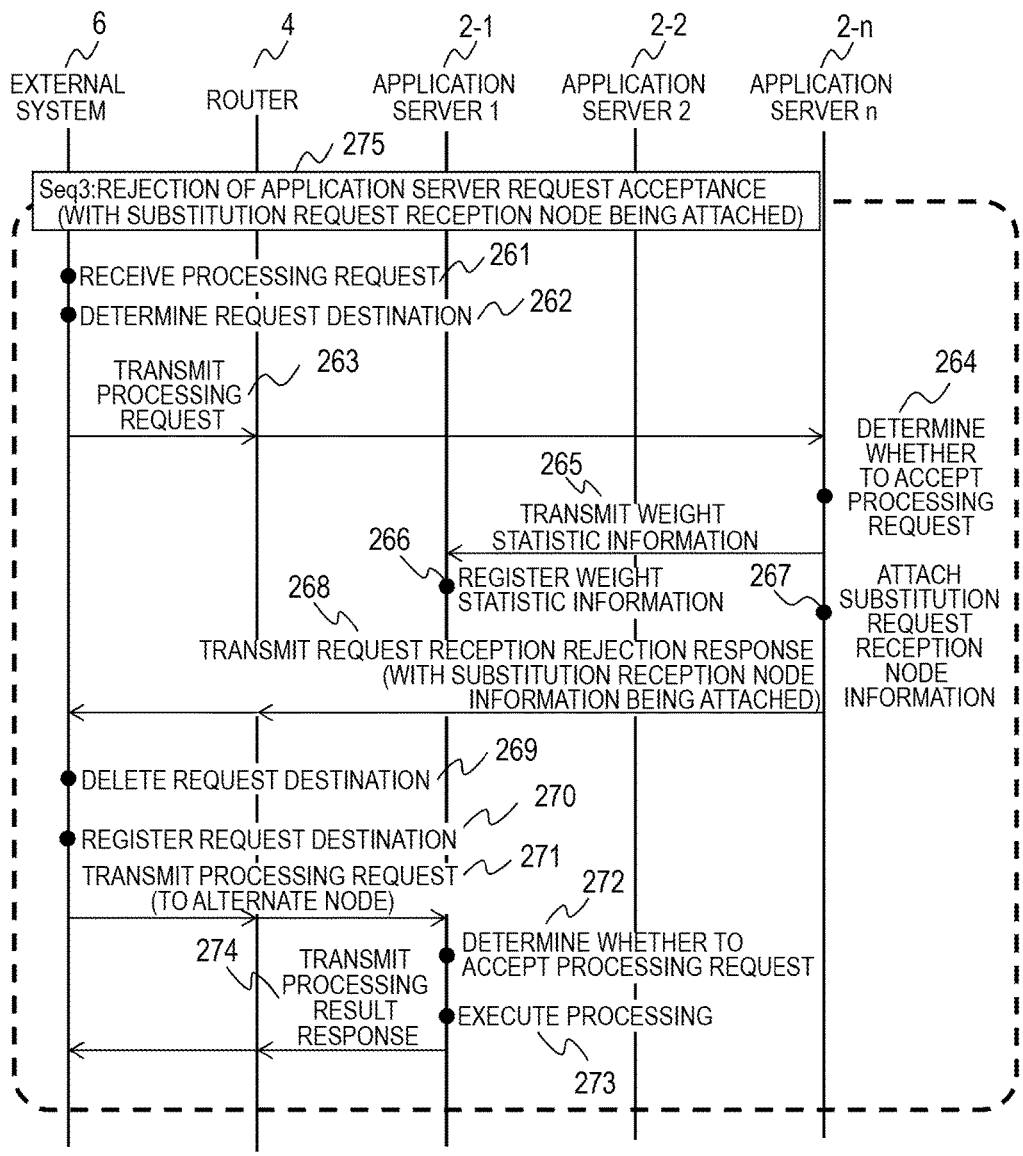
FIG. 16 is a diagram illustrating a sequence of processing according to the first embodiment.

Next, with reference to the sequence Seq3 of FIG. 16: the rejection of application server request acceptance (with a substitution request destination node being attached) 275, a description is made of an operation conducted by the external system 6 receiving the rejection response and transmitting the processing request to the alternate processing request destination. The processing illustrated in FIG. 16 from the processing request reception (Step 261) and the request destination determination (Step 262) up to the processing request transmission (Step 263) is the same as the processing from the processing request reception (Step 231) up to the processing request transmission (Step 237) of the above-mentioned Seq1, and hence a description thereof is omitted.

In a case where it is determined that the application server 2-n is to accept the processing request, the processing of the flowchart illustrated in FIG. 19 is executed. In a case where it is determined that the value is "cannot be accepted" in Step 324 (Step 264), there is a chance that the sequence Seq3 may be executed.

With reference to the flowchart of FIG. 19, a description is made of the operation of the application server 2.

In a case where the value is "cannot be accepted" in Step 324, the application server 2 advances to Step 325.

In Step 325, in the same manner as in Step 308 of FIG. 18, records of the other-node management table 59 are acquired via the other-node status management module 61, and the acquired records are compared with one another. It should be noted that in Step 325, the own node is not included in the comparison targets. This is because it is confirmed in Step 324 that the own node has "cannot be accepted" as the current acceptability status.

Subsequently, it is determined whether another node to be the target exists based on the comparison result obtained in Step 325 (Step 326). In a case where the node that can execute the processing exists, before the information on an alternate server is transmitted to the external system 6, the acceptance weight statistic value is transmitted to the application server 2-1 of a substitution target (Step 332). This is because in a case of receiving the processing request from the external system 6, the application server 2 of the substitution target takes over the acceptance weight statistic value managed by the application server 2 of a substitution source and makes use thereof to determine whether to respond to the broadcast packet.

Specifically, first, the other-node management table 59 is referred to via the other-node status management module 61, to extract a record in which the IP address of the external system 6 analyzed in Step 322, the external system 132 of the processing count management table 131, and the external system 372 of the acceptance weight statistic value management table 371 match one another. For example, in a case where the IP address of the external system 6 included in the processing request is "192.168.1.21", the record 137 of the processing count management table 131 illustrated in FIG. 8 and the record 374 of the acceptance weight statistic value management table 371 illustrated in FIG. 9A correspond to the above-mentioned record.

Subsequently, based on those records, the status analysis/generation module 64 generates the acceptance weight statistic value to be transmitted to the application server 2 of the substitution target. The other-node status transmission/reception module 65 transmits the generated acceptance weight statistic value to the application server 2 of the substitution target. For example, in the case illustrated in FIG. 16, the application server 2-*n* selects the application server 2-1 as the alternate server, transmits the acceptance weight statistic value information to the application server 2-1, and notifies the application server 2-1 of the information on the external system 6 that has requested the processing (Step 265). The status analysis/generation module 64 accesses the other-node management table 59 via the other-node status management module 61, and acquires the IP address of the application server 2-1 of the transmission destination from the IP address 213 of the other-node management table 59 illustrated in FIGS. 14A and 14B.

On the application server 2-1, the other-node status transmission/reception module 65 receives the acceptance weight statistic value, and the received acceptance weight statistic value is added via the status analysis/generation module 64 by the other-node status management module 61 as records of the processing count management table 131 illustrated in FIG. 8 and the acceptance weight statistic value management table 371 illustrated in FIG. 9A within the other-node management table 59 (Step 266).

The description of the processing executed by the application server 2-*n* is resumed referring back to FIG. 19. On the application server n, after the acceptance weight statistic value is transmitted in Step 332, the processing request analysis/processing result returning module 73 generates a response for rejecting the acceptance (Step 329). The generated response includes the node name, the IP address, and the processing request reception port number of the node identified as the alternate node in comparison in Step 325. Specifically, the processing request analysis/processing result returning module 73 acquires the values of the node name 212, the IP address 213, and the processing request port number 217 from the other-node management table 59 illustrated in FIGS. 14A and 14B, and includes the values in the request acceptance rejection response. This processing corresponds to attaching of substitution request acceptance node information 267 of FIG. 16. The processing request transmission/reception module 74 transmits the generated response message to the external system 6 (Step 330). After that, the processing request reception processing is brought to an end (Step 331).

The request acceptance rejection response transmitted to the external system 6 in Step 330 arrives at the external system 6 via the router 4 in Step 268 of FIG. 16.

The external system 6 waits for the response to the processing request in Step 292 illustrated in FIG. 17. In a case where the response arrives in Step 268, the external system 6 determines whether the received response is normal (Step 296). However, this response is the rejection response, and hence "N" is determined in Step 296, to acquire information on the application server 2 to be the substitution target from the rejection response message (Step 297). Then, the information on the processing request destination registered in the memory is unnecessary, and hence the external system 6 deletes the information on the processing request destination (Step 298). After that, the procedure returns to Step 289 to register the processing request destination of the substitution target. The information on the substitution request destination acquired in Step 297 is the same information as the information on the broadcast response received in Step 286. Specifically, the node name 212, the IP address 213, and the processing request port number 217 within the other-node management table 59 illustrated in FIGS. 14A and 14B are registered. This processing corresponds to request destination deletion 269 and request destination registration 270 of FIG. 16.

The subsequent sequence (Steps 271 to 274) is the same as the sequence (Steps 237 to 240) Seq1: the initial processing request 255. In other words, the external system 6 transmits the processing request to the substitution request destination (Step 271). The application server 2-1 of the substitution target determines the processing request acceptability (Step 272), executes the requested processing (Step 273), and returns the processing result (normal response) to the external system 6 (Step 274).

Next, a description is made of processing conducted by the application server 2 calculating the acceptance weight statistic value and the current acceptance weight value.

FIG. 12 illustrates an example of a configuration of the processing request management queue 72.

The processing request management queue 72 includes columns of an IP address 172 of the external system of the transmission source, a received message 173, a processing 174, and a status 175. The status 175 is a value of any one of "waiting for processing", "under processing", and "processing completed". The configuration of the processing request management queue 72 may have a table format or may have another format. Further, the processing request management queue 72 may be held in the memory 13, or may be held in the database 22.

The operation of the processing request management queue 72 is described. In a case where a new processing request is input to the processing request management queue 72, a new record is added to the bottom row of the table of the processing request management queue 72. Further, in a case where the request processing execution module 70 executes the processing, the record in the top row of the table of the processing request management queue 72 is acquired, and the status 175 of this record is updated from "waiting for processing" to "under processing". In a case where the processing for the record in the top row is completed, the processing request management queue 72 notifies the processing request analysis/processing result returning module 73 of completion of the processing, and updates the status 175 to "processing completed". Then, the processing request analysis/processing result returning module 73 transmits the processing result response to the external system 6 via the processing request transmission/reception module 74. In a case where the transmission the processing result response is completed, the processing request management queue 72 deletes the record for this processing from the processing request management queue 72.

When the record is added to and deleted from the processing request management queue 72, while the requested processing is executed, count up processing for the acceptance weight statistic value and update processing for the current acceptance weight value are executed.

Figure 5:
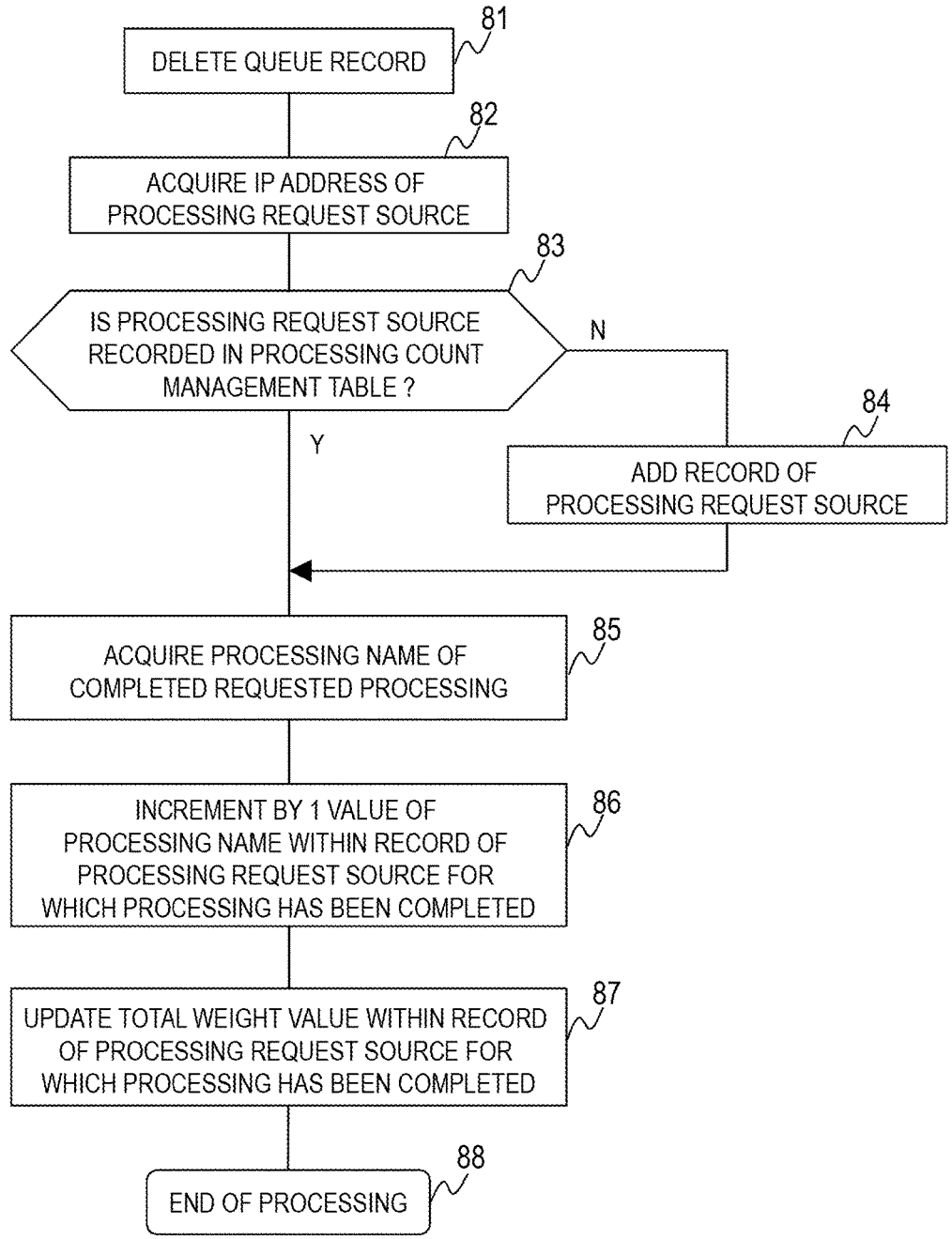
FIG. 5 is a flowchart of processing for updating a processing count used for the acceptance weight statistic value according to the first embodiment.

FIG. 5 is a flowchart of processing for updating a processing count used for the acceptance weight statistic value.

First, in a case where detecting the deletion of the record from the processing request management queue 72 (Step 81), the own-node status management module 62 acquires the IP address of the external system 6 of the processing request source from the transmission source 172 of the processing request management queue 72 (Step 82).

Subsequently, it is determined whether the acquired IP address is recorded in the processing count management table 131 illustrated in FIG. 8 (Step 83). In a case where the acquired IP address is not recorded in the processing count management table 131, in order to register the external system 6 of a new processing request source, the record in which the IP address 132 of the external system is the IP address of the external system 6 of the processing request source is added to the processing count management table 131 (Step 84). At this time, "0" is recorded in the record for the other columns 133 to 136 of the processing count management table 131.

On the other hand, in a case where it is determined in Step 83 that the acquired IP address is recorded in the processing count management table 131, the procedure advances to Step 85 to acquire the processing name of the completed requested processing from the records of the deleted processing request management queue 72 (Step 85). For example, in a case where the record 176 is deleted from the processing request management queue 72 illustrated in FIG. 12, the fact that the completed processing is "p1" can be acquired from the processing 174.

Subsequently, in the processing count management table 131, the values of the completed processing 133 to processing 135 corresponding to the processing request source are incremented by 1 (Step 86). For example, in a case where the record 176 is deleted from the processing request management queue 72 illustrated in FIG. 12, the IP address of the external system 6 of the transmission source is "192.168.2.21" with the requested processing being "p1", and hence the value of "p1" 133 within the record 137 of the processing count management table 131 is incremented by 1.

After that, the total weight value 136 of the record 137 of the processing count management table 131 is updated (Step 87). Specifically, the weighting factor of the corresponding processing is acquired from the weighting factor 144 of the execution processing management table 67 illustrated in FIG. 10, and is added to the total weight value 136 of the record 137 of the processing count management table 131. After that, the processing count update processing is brought to an end (Step 88).

In this manner, when the requested processing is completed, the application server 2 executes the processing count update processing, and updates the processing count management table 131.

Subsequently, a description is made of an operation conducted by each application server calculating the acceptance weight statistic value to be referred to in Step 303 and Step 308 of the above-mentioned acceptability determination processing illustrated in FIG. 18.

Figure 6:
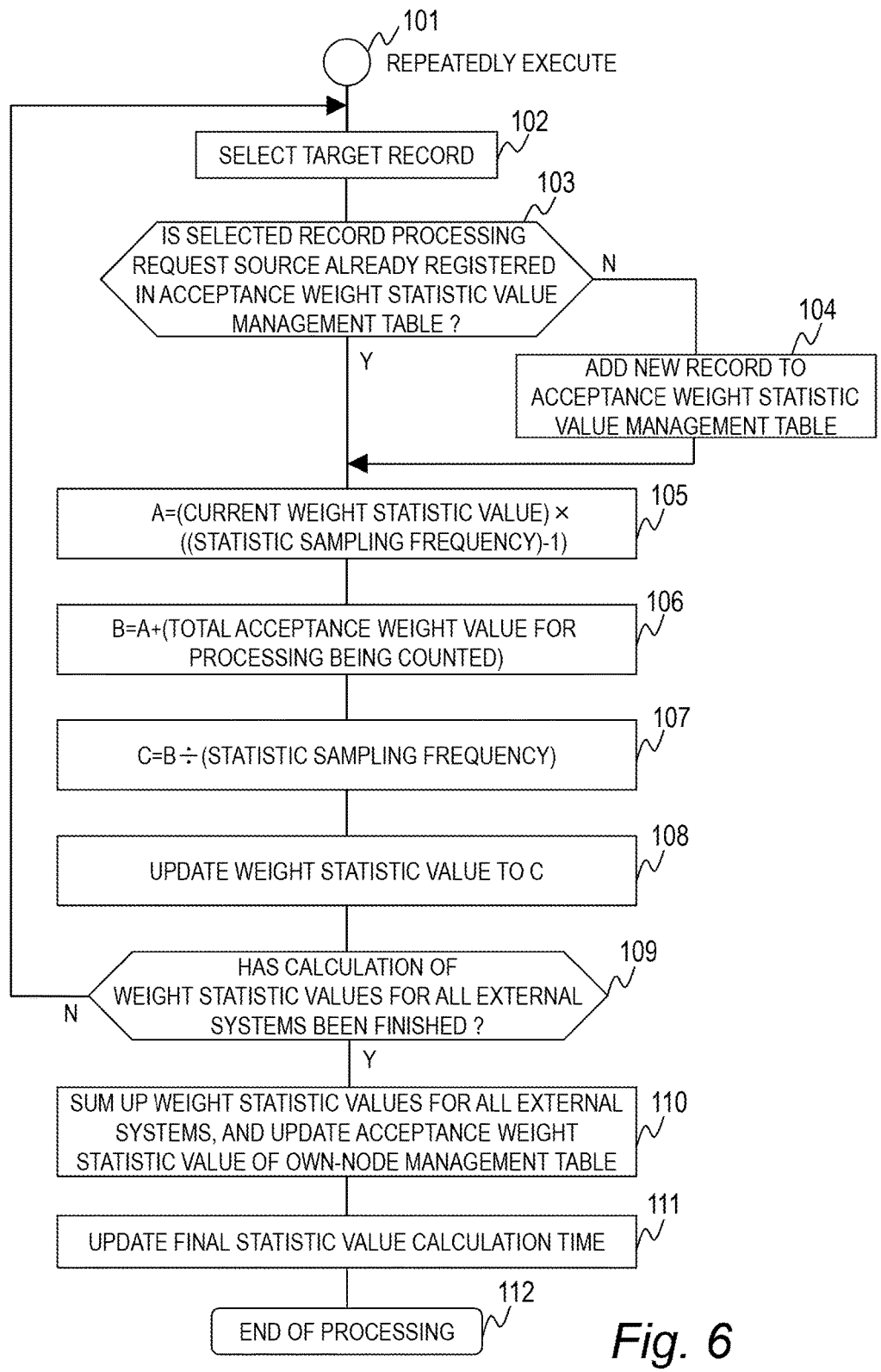
FIG. 6 is a flowchart of acceptance weight statistic value calculation processing according to the first embodiment.

FIG. 6 is a flowchart of acceptance weight statistic value calculation processing.

The application server 2 executes statistic value calculation processing repeatedly (for example, at predetermined time periods) (Step 101). A parameter for controlling a calculation time of the statistic value is recorded in the memory in advance. For example, a statistic value calculation interval may be set to 3,600 seconds (namely, every hour). The application server 2 uses this calculation to calculate the statistic value. Further, a sampling frequency used for one calculation of the statistic value may be recorded. In addition, a time at which the statistic value is calculated lastly may be recorded. The application server 2 calculates the subsequent acceptance weight statistic value at a time at which the statistic value calculation interval is added to a final statistic value calculation time. For example, in a case where the final statistic value calculation time is "2014/06/24 13:31:15", the subsequent calculation processing start time is one hour thereafter, namely, "2014/06/24 14:31:15".

Subsequently, the record of the external system 6 set as a processing target is selected from the processing count management table 131 illustrated in FIG. 8 (Step 102). Each record is processed by a loop of the statistic value calculation processing, and the statistic values are calculated for all the records finally.

Subsequently, it is determined whether the IP address 132 of the external system of the selected record is registered in the external system 372 of the acceptance weight statistic value management table 371 illustrated in FIG. 9A (Step 103).

In a case where the external system 6 of the selected record is not registered in the acceptance weight statistic value management table 371, the statistic value of this external system 6 is calculated for the first time, and hence the record is added to the acceptance weight statistic value management table 371 (Step 104). At that time, the value of the total weight value 136 of the processing count management table 131 illustrated in FIG. 8 is registered as the value of the acceptance weight statistic value 373. The value of this weight statistic value is used as the statistic value to be calculated first.

Subsequently, the statistic is calculated in Steps 105 to 108. First, a value is calculated by multiplying the current weight statistic value by ((statistic sampling frequency)−1) (Step 105). For example, in a case where the statistic value is calculated based on the value of the record 374 of the acceptance weight statistic value management table 371 illustrated in FIG. 9A, the acceptance weight statistic value 373 of the record 374 is "233" with the statistic sampling frequency being "3", and hence a calculation result thereof is 233×(3−1)=466.

Subsequently, the total weight value 136 of the processing count management table 131 is added to the multiplication value calculated in Step 105 (Step 106). For example, the total weight value 136 within the record 137 of the processing count management table 131 is "302", and hence a calculation result thereof is 466+302=768.

Subsequently, a value is calculated by dividing the addition value calculated in Step 106 by the statistic sampling frequency (Step 107). For example, the statistic sampling frequency is "3", and hence a calculation result thereof is 768/3=256. It should be noted that this value is used as a new weight statistic value.

Finally, the calculation result of Step 107 is recorded in the acceptance weight statistic value 373 (Step 108). In comparison between the acceptance weight statistic value management table 371 before an update illustrated in FIG. 9A and the acceptance weight statistic value management table 371-2 after the update illustrated in FIG. 9B, the weight statistic value of the external system 6 whose IP address is 192.168.1.21 has changed from "233" to "256".

When the processing is finished up to Step 108 for one selected external system 6, it is determined whether the calculation of the weight statistic values for all the external systems 6 has been finished (Step 109). In a case where the weight statistic values have not been calculated for a part of external systems 6, the procedure returns to Step 102 to select the record of the external system 6 for which the statistic value is to be calculated next. On the other hand, in a case where the calculation of the weight statistic values has been finished for all the external systems 6, the acceptance weight statistic values obtained after the calculation for all the external systems 6 are summed up, and the total value is used to update the value of the acceptance weight statistic value 126 of the own-node management table 60 illustrated in FIG. 7A (Step 110). For example, the total value of the acceptance weight statistic value 373 of the respective records of the acceptance weight statistic value management table 371-2 illustrated in FIG. 9B is the acceptance weight statistic value obtained after the calculation of the statistic values for all the external systems 6, namely, 256+45+445=746.

Finally, in Step 111, the final statistic value calculation time recorded in the memory is updated to the current time, and the acceptance weight statistic value calculation processing is brought to an end (Step 112).

Next, a description is made of processing for updating the current acceptance weight value and the acceptability status of the application server 2 when the record is added to or deleted from the processing request management queue 72.

Figure 11A:
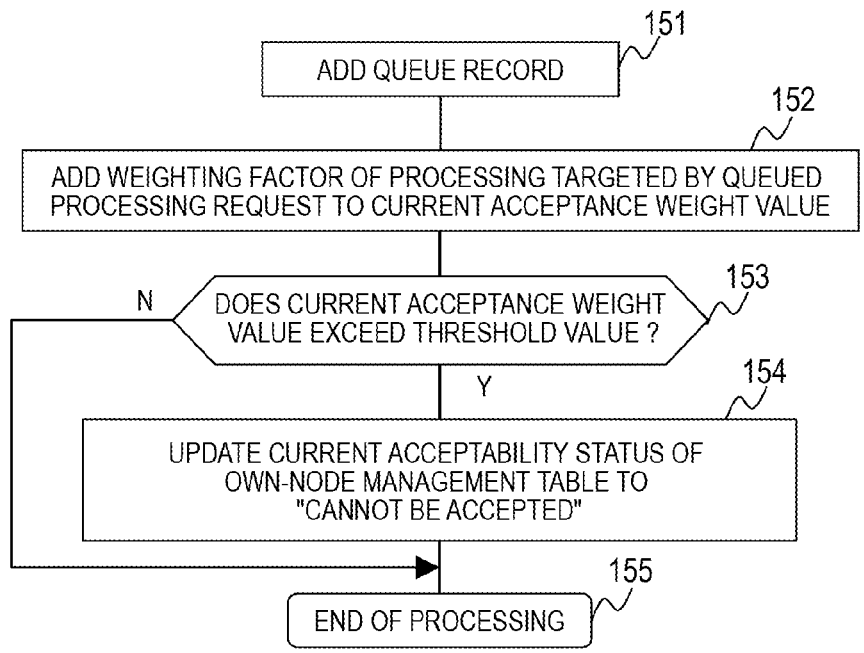
FIG. 11A is a flowchart of update processing conducted when a queue record is added according to the first embodiment.

FIG. 11A is a flowchart of update processing conducted when a queue record is added.

When a record is added to the processing request management queue 72 illustrated in FIG. 12 (Step 151), the own-node status management module 62 adds the weighting factor of the processing targeted by the added processing request to the current acceptance weight value of the own-node management table 60 illustrated in FIG. 7A (Step 152). Specifically, the own-node status management module 62 acquires the weighting factor of the processing targeted by the added processing request from the weighting factor 144 of the execution processing management table 67 illustrated in FIG. 10. Further, the own-node status management module 62 searches the execution processing management table 67 for the record that matches the processing 174 of the added record received from the processing request management queue 72. For example, in a case where the record 177 is added to the processing request management queue 72, the processing 174 is "p3", to which the record 146 of the execution processing management table 67 corresponds, and the weighting factor of this processing p3 is "1". As a result, the own-node status management module 62 adds 1 to the current acceptance weight value 127 of the own-node management table 60.

Subsequently, it is determined whether the current acceptance weight value exceeds a threshold value (Step 153). The threshold value is a value set in advance in the application server 2, and, for example, "30" is defined as the threshold value. When the current acceptance weight value exceeds the threshold value, the acceptance becomes impossible. In a case where the current acceptance weight value does not exceed the threshold value, Step 154 is skipped to bring the update processing to an end (Step 155).

On the other hand, in a case where the current acceptance weight value exceeds the threshold value, the current acceptability status 128 of the own-node management table 60 is updated to "cannot be accepted" (Step 154). As a result, it is determined that the broadcast is not to be responded to in Step 307 of the acceptability determination processing illustrated in FIG. 18, and the processing request is rejected in Step 324 of the processing request reception processing illustrated in FIG. 19.

Figure 11B:
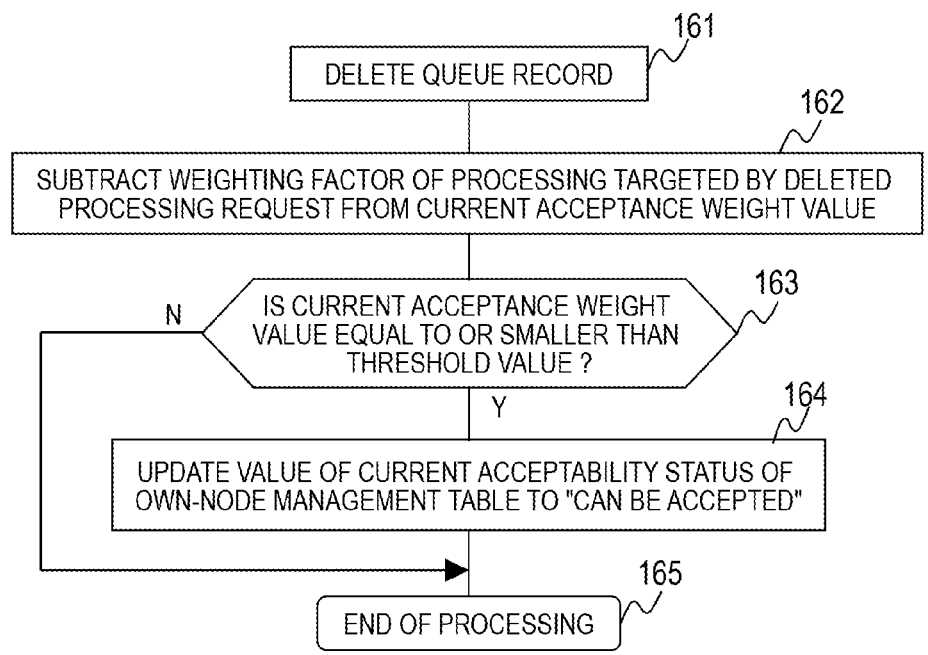
FIG. 11B is a flowchart of update processing conducted when a queue record is deleted according to the first embodiment.

FIG. 11B is a flowchart of update processing conducted when a queue record is deleted.

When a record is deleted from the processing request management queue 72 (Step 161), the own-node status management module 62 acquires the weighting factor of the processing targeted by the deleted processing request from the weighting factor 144 of the execution processing management table 67 illustrated in FIG. 10, and subtracts the weighting factor from the current acceptance weight value of the own-node management table 60 illustrated in FIG. 7A (Step 162).

Subsequently, it is determined whether the current acceptance weight value is equal to or less than a threshold value (Step 163). The threshold value is a value set in advance in the application server 2, and, for example, "30" is defined as the threshold value. In a case where the current acceptance weight value is not equal to or less than the threshold value, Step 164 is skipped to bring the update processing to an end (Step 165).

On the other hand, in a case where the current acceptance weight value is equal to or less than the threshold value, the current acceptability status 128 of the own-node management table 60 is updated to "can be accepted" (Step 164). As a result, it is determined that the broadcast is to be responded to in Step 307 of the acceptability determination processing illustrated in FIG. 18, and the processing request is received in Step 324 of the processing request reception processing illustrated in FIG. 19.

Next, a description is made of sharing of information among servers in a case where there is a change in the status of the application server 2 (e.g. when the server starts up, when there is a change in the server status, or when the server goes down). In this embodiment, the application servers 2 share the other-node management table 59 illustrated in FIGS. 14A and 14B, but may share another information.

Figure 13:
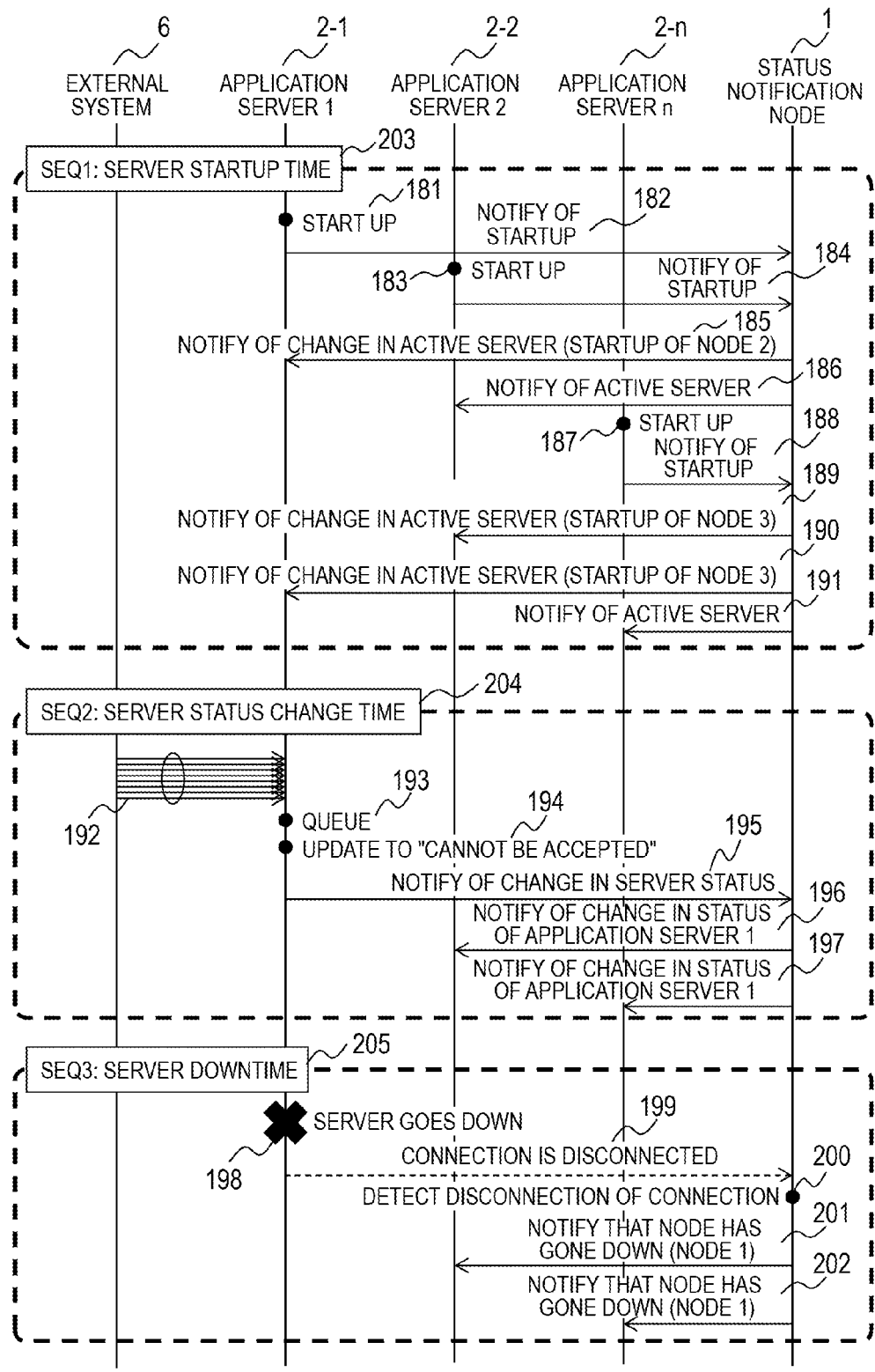
FIG. 13 is a sequence diagram illustrating sharing of information among application servers according to the first embodiment.

FIG. 13 is a sequence diagram illustrating sharing of information among application servers in a case where there is a change in the status of the application server 2.

First, the operation for sharing the information when each application server starts up is described with reference to the sequence Seq1: a server startup time 203.

For example, the application server 2-1 starts up (Step 181). As illustrated in FIG. 7B, the own-node management table 60-1 of the application server 2-1 immediately after the startup has the acceptance weight statistic value 126 of "0", the current acceptance weight value 127 of "0", and the current acceptability status 128 of "can be accepted". After the startup, the application server 2-1 notifies the status notification node 1 of the fact of the startup and the current status of the own node (Step 182). Before the application server 2-1 starts up, the IP address of the status notification node 1 is set in advance in the record 129 of the own-node management table 60-1.

In a case where receiving a startup notification 182, the status notification node 1 holds the fact of the application server 2-1 being active and the transmitted information in an internal storage apparatus thereof. Further, the status notification node 1 notifies another application server, the information on which is held thereby, of the addition/change of the information on the application server 2-1. In the illustrated example, at a timing at which the startup notification 182 is received from the application server 2-1, another application server has not started up, while the status notification node 1 does not hold the information on the application server 2 that has started up as well, and hence another application server 2 is not notified.

After that, the application server 2-2 starts up (Step 183). After the startup, in the same way as the application server 2-1, the application server 2-2 notifies the status notification node 1 of the fact of the startup and the current status of the own node (Step 184). in a case of receiving a startup notification 184, the status notification node 1 holds the information on the application server 2-1 at this timing, and therefore notifies the application server 2-1 of the fact of the addition of the application server 2-2 and the status information on the application server 2-2 (Step 185).

Further, the newly-started application server 2-2 is notified of the information on the currently-active application server (Step 186). On the application server 2-2, the other-node status transmission/reception module 65 receives the information on the active application server, and the status analysis/generation module 64 registers the information on the notified another application server 2 in the other-node management table 59 via the other-node status management module 61. In a case where the same application server is already registered, the already-registered information is updated.

After that, in a case where an application server 2-3 starts up (Step 187), in the same manner as described above, the application server 2-3 transmits a startup notification to the status notification node 1 (Step 188). The status notification node 1 notifies the application servers 2-1 and 2-2 of an active server change notification (Steps 189 and 190). The newly-started application server 2-3 is notified of the information on the currently-active application server (Step 191).

As a result, the current status of each application server can be shared among the application servers. For example, FIG. 14B illustrates a configuration of the other-node management table 59-1 of the application server 2-1 after the sequence Seq1: the server startup time 203.

Next, with reference to the sequence Seq2: a server status change time 204, a description is made of an operation for sharing information when there is a change in the value within the own-node management table 60 of the application server 2.

For example, the application server 2-1 receives a large quantity of processing requests (Step 192). The application server 2-1 registers the received processing requests in the processing request management queue 72 in Step 327 of the processing request reception processing illustrated in FIG. 19 (Step 193), and updates the current acceptance weight value in Step 152 of the update processing illustrated in FIG. 11A. However, in a case where a predetermined amount of data is stored in the queue, the current acceptance weight value exceeds the threshold value, and hence the processing of Step 154 of the update processing illustrated in FIG. 11A is executed to update the current acceptability status to "cannot be accepted" (Step 194).

After that, the application server 2-1 notifies the status notification node 1 of the change in the status (Step 195). In a case where receiving a status change notification 195, the status notification node 1 holds a new status of the application server 2-1 in the internal storage apparatus. Further, the status notification node 1 notifies another application server, the information on which is held thereby, of the change in the information on the application server 2-1 (Steps 196 and 197). In the illustrated example, at a timing at which the status change notification 195 is received from the application server 2-1, the other application servers 2-2 and 2-n are active, and the status notification node 1 holds the information on those application servers. Therefore, the status notification node 1 notifies the other application servers 2-2 and 2-n of the change in the status of the application server 2-1.

On the application servers 2-2 and 2-n, the other-node status transmission/reception module 65 receives the information on the active application server, and the status analysis/generation module 64 updates the information on the notified another application server 2 in terms of the information on the another application server within the other-node management table 59 via the other-node status management module 61.

Next, with reference to the sequence Seq3: a server downtime 205, a description is made of an operation for sharing the information when the application server goes down.

The application server 2-1 and the status notification node 1 have established a connection since the startup notification is received from the application server 2-1. The status notification node 1 monitors this connection regularly. For example, in a case where the application server 2-1 goes down (Step 198), the connection between the application server 2-1 and the status notification node 1 is disconnected (Step 199). Therefore, when a fixed period has elapsed since the application server 2-1 goes down, the status notification node 1 detects that the connection to the application server 2-1 has been disconnected based on the regular monitoring (Step 200).

In a case where detecting that the connection has been disconnected in Step 200, the status notification node 1 holds the new status of the application server 2-1 in the internal storage apparatus. Further, the status notification node 1 notifies another application server, the information on which is held thereby, that the application server 2-1 has gone down (Steps 201 and 202). In the illustrated example, at a timing at which it is detected that the application server 2-1 is down, the other application servers 2-2 and 2-n are active, and the status notification node 1 holds the information on those application servers. Therefore, the status notification node 1 notifies the other application servers 2-2 and 2-n that the application server 2-1 is down.

On the application servers 2-2 and 2-n, the other-node status transmission/reception module 65 receives the information on the active application server, and the status analysis/generation module 64 updates the information on the notified another application server 2 by changing the status 214 within the other-node management table 59 to "inactive" via the other-node status management module 61.

In this manner, the respective application servers share the information on each thereof via the status notification node 1. It should be noted that a method of sharing the information may be a method other than that exemplified above.

Figure 22:
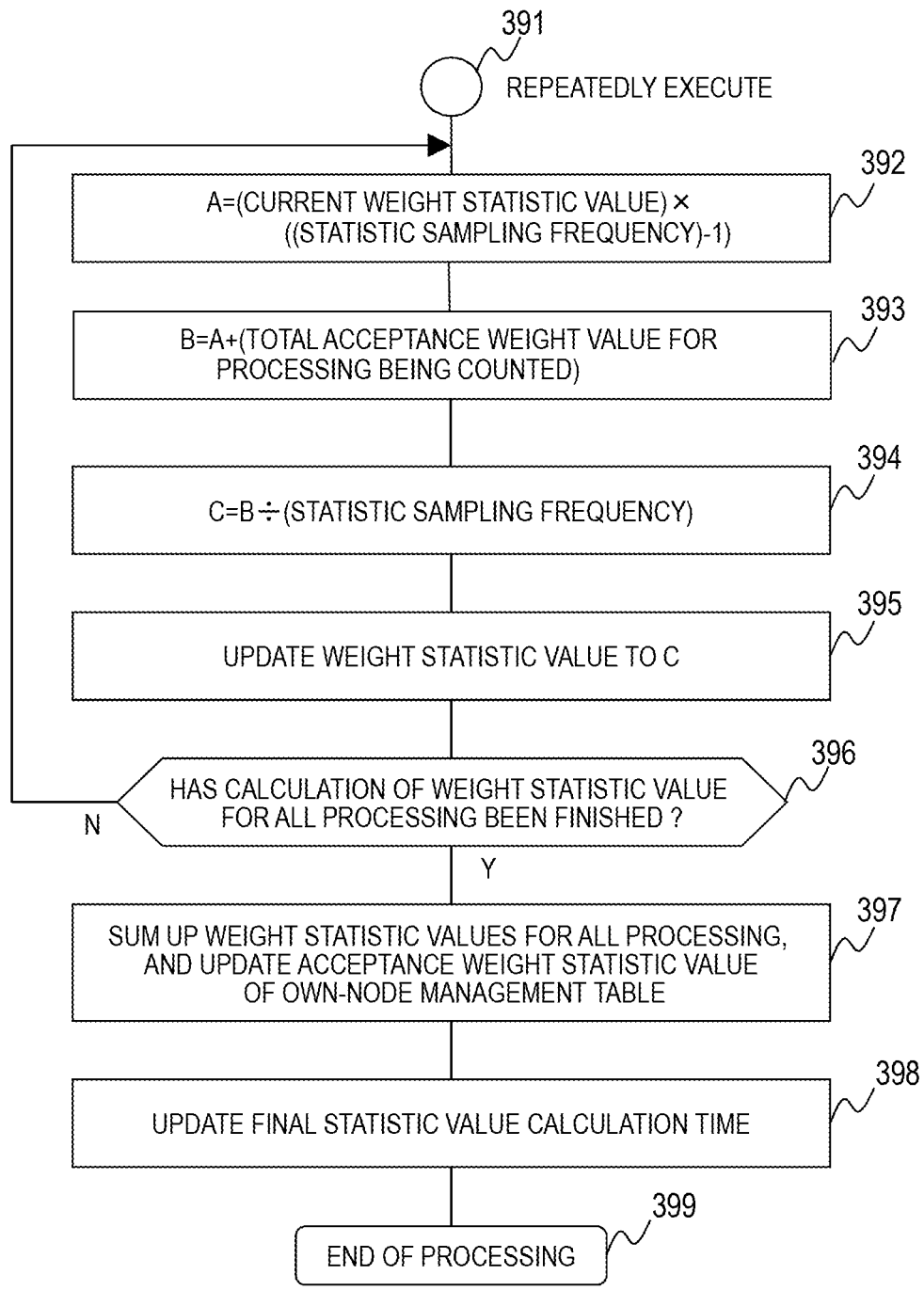
FIG. 22 is a flowchart of an acceptance weight statistic value calculation processing according to the first embodiment.

FIG. 21A, FIG. 21B and FIG. 22 illustrate, another example of the above-mentioned acceptance weight statistic value calculation processing illustrated in FIG. 6 and illustrated in FIG. 9A.

FIG. 6 illustrates the processing for calculating the acceptance weight statistic value for each external system, and FIG. 9A illustrates the acceptance weight statistic value management table for managing the calculated acceptance weight statistic value for each external system. On the other hand, FIG. 22 illustrates the processing for calculating the acceptance weight statistic value for each processing, and FIG. 21A and FIG. 21B each illustrates the statistic management table for managing the calculated acceptance weight statistic value for each processing.

In the acceptance weight statistic value calculation processing illustrated in FIG. 22, in the same manner as in FIG. 6, the application server executes the processing repeatedly (for example, at predetermined time periods) (Step 391).

In Steps 392 to 395, the statistic value is calculated for each processing. For example, in regard to the processing p1, in Step 392, "15" of a number 383 of requests within a record 384 of an acceptance weight statistic value management table 381 illustrated in FIG. 21A in which a processing 382 is "p1" is used. In Step 393, the total values of the column 133 for all the external systems within the processing count management table 131 illustrated in FIG. 8 are added. In Step 394, the calculated addition value is divided by the statistic sampling frequency "3". In Step 395, the number 383 of requests and the weight 385 within the acceptance weight statistic value management table 381 illustrated in FIG. 21A are updated.

After that, when the processing is finished up to Step 108 for the selected one processing, it is determined whether the calculation of the weight statistic values for all the processing has been finished (Step 396).

The processing of Steps 397 and 398 is the same as the processing of Steps 110 and 111 of FIG. 6.

In comparison between the acceptance weight statistic value management table 381 before the update illustrated in FIG. 21A and the acceptance weight statistic value management table 381-2 after the update illustrated in FIG. 21B, the weight statistic value of the processing p1 has changed from "30" to "42".

In this manner, the acceptance weight statistic values for each processing illustrated in FIGS. 24A to 24C can be shared among the nodes.

It should be noted that it suffices to execute both or only any one of the sequence illustrated in FIG. 6 and the sequence illustrated in FIG. 22. It should be noted that in order to share information of the same kind among the application servers 2, the application servers 2 that share the information needs to conduct the same processing, and each of the application servers 2 needs to calculate the same information.

As described above, according to the first embodiment of this invention, without the need to introduce a special apparatus such as a load balancing apparatus or a name server, it is possible to realize application servers in a distributed environment by a general-purpose network apparatus such as an L2SW or an L3SW, which can ensure load distribution or redundancy.

Further, it is possible to resolve a bottleneck in system expansion. In addition, apparatus managed within the system decrease in number, which can reduce time and labor of management and a cost thereof.

In addition, an allocation destination is determined by referring to the processing request issued to each node and the acceptance weight statistic value, which can further enhance efficiency of the load distribution for an entire node cluster.

Further, the application server of the substitution target is selected by referring to the acceptance weight statistic value, and hence even when the own node cannot execute the processing, it is possible to select an appropriate application server. Further, the external system that has transmitted the processing request is notified of the information on the selected application server of the substitution target, and the selected application server of the substitution target is notified of the information on the external system that has transmitted the processing request, which allows the application server of the substitution target to take over the processing with reliability.

Further, the application server having the smallest acceptance weight statistic value is selected as the application server of the substitution target, and hence it is possible to accurately select the application server having a low load.

Further, the acceptance weight statistic value is set as the load information calculated for each external system by multiplying a frequency for each type of processing requested by each external system by the weighting factor of the type of processing, and hence it is possible to identify the external system that is making processing requests in a concentrated manner. Therefore, it is possible to select the application server on which an average load is imposed from a plurality of external systems instead of the application server on which a load is concentrated from a specific external system.

Further, the acceptance weight statistic value is set as the load information calculated for each type of processing by multiplying the frequency for each type of processing requested by each external system by the weighting factor of the type of processing, and hence it is possible to balance the load of processing for each processing.

Further, the application server having the smallest acceptance weight statistic value is determined to respond to the broadcast, and hence it is possible to select the application server having a low load.

Further, the acceptance weight statistic values are compared among the application servers that can currently accept the processing request, and hence the allocation destination can be accurately determined by excluding the computer that is not currently ready to accept the processing request due to a sudden fluctuation in the load.

Further, the acceptance weight statistic values are compared among currently-active computers, and hence the allocation destination can be accurately determined by excluding the computer being stopped due to maintenance or the like.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit.

The above-described configurations and functions may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings illustrates control lines and information lines as considered necessary for explanation but do not illustrate all control lines or information lines in the products. It can be considered that almost of all components are actually interconnected.

What is claimed is:

1. A computer system, comprising:
   a plurality of computers, wherein each of the plurality of computers includes:
      a memory,
      a network interface communicatively coupled to the plurality of computers via a network, and
      a processor communicatively coupled to the network interface and the memory; and
   a plurality of external systems that are communicatively coupled to the plurality of computers via the network;
   wherein the processor of each of the plurality of computers:
   calculates an acceptance weight statistic value based on either:
      i) load information calculated for each of the plurality of external systems based on a type and a frequency of processing requested by each of the plurality of external systems and a weighting factor defined to correspond to each type of processing, or
      ii) load information calculated for each type of the processing based on a type and a frequency of processing requested by each of the plurality of external systems and a weighting factor defined to correspond to each type of processing;
   shares, using the network interface, the acceptance weight statistic value with one or more computers in a same network segment of the network;
   receives a broadcast transmitted from one of the plurality of external systems to the same network segment;
   determines whether to respond to the broadcast received by referring to the acceptance weight statistic value shared; and
   sends a response to the one of the plurality of external systems that has transmitted the broadcast in order to allow the one of the plurality of external systems to transmit a processing request in a case where it is determined to respond to the broadcast received.

2. The computer system according to claim 1, wherein the processor of each of the plurality of computers further:
   receives the processing request from one of the plurality of external systems;
   determines whether to execute processing requested by the processing request;
   selects an alternate computer from the plurality of computers by referring to the acceptance weight statistic value shared in a case where it is determined not to execute the requested processing;
   notifies the one of the plurality of external systems that has transmitted the processing request of information on the alternate computer selected; and
   notifies the alternate computer selected of information on the one of the plurality of external systems that has transmitted the processing request.

3. The computer system according to claim 1, wherein the processor of each of the plurality of computers determines to respond to the broadcast in a case where the acceptance weight statistic value is smaller than that of the one or more computers in the same network segment of the network.

4. The computer system according to claim 3, wherein:
   the processor of each of the plurality of computers further:
   shares, using the network interface, information on whether each of the plurality of computers is ready to accept the processing request, and
   determines to respond to the broadcast in a case where the acceptance weight statistic value is smallest of computers that are ready to accept the processing request currently.

5. The computer system according to claim 3, wherein:
   the processor of each of the plurality of computers further:
   shares, using the network interface, information on whether each of the plurality of computers is active, and
   determines to respond to the broadcast in a case where the acceptance weight statistic value is smallest of currently active computers.

6. The computer system according to claim 2, wherein the processor of each of the plurality of computers selects one of the plurality of computers having a smallest acceptance weight statistic value as the alternate computer.

7. A computer comprising:
   a memory;
   a network interface communicatively coupled to a plurality of computers and a plurality of external systems via a network; and
   a processor communicatively coupled to the memory the network interface,
   wherein the processor:
   calculates an acceptance weight statistic value based on either:
      i) load information calculated for each of the plurality of external systems based on a type and a frequency of processing requested by each of the plurality of external systems and a weighting factor defined to correspond to each type of processing, or
      ii) load information calculated for each type of the processing based on a type and a frequency of processing requested by each of the plurality of external systems and a weighting factor defined to correspond to each type of processing;
   shares, using the network interface, the acceptance weight statistic value with one or more computers in a same network segment of the network;
   receives a broadcast transmitted from one of the plurality of external systems;
   determines whether to respond to the broadcast received by referring to the acceptance weight statistic value shared; and
   send a response to the one of the plurality of external systems that has transmitted the broadcast in order to allow the one of the plurality of external systems to transmit a processing request in a case where it is determined to respond to the broadcast received.

8. The computer according to claim 7, wherein the processor further:
receives the processing request from one of the plurality of external systems;
determines whether to execute processing requested by the processing request;
selects an alternate computer by referring to the acceptance weight statistic value shared of each computer in a case where it is determined not to respond to the requested processing;
notifies the one of the plurality of external systems of information on the alternate computer selected; and
notify the alternate computer selected of information on the one of the plurality of external systems that has transmitted the processing request.

9. A load balancing method comprising:
receiving, by a processor of a computer, a broadcast transmitted from one of a plurality of external systems, wherein the computer includes a network interface that is communicatively coupled to a plurality of computers and a plurality of external devices via a network;
calculating, by the processor, an acceptance weight statistic value based on either:
i) load information calculated for each of the plurality of external systems based on a type and a frequency of processing requested by each of the plurality of external systems and a weighting factor defined to correspond to each type of processing, or
ii) load information calculated for each type of the processing based on a type and a frequency of processing requested by each of the plurality of external systems and a weighting factor defined to correspond to each type of processing;
sharing, using the network interface, the acceptance weight statistic value with one or more computers in a same network segment of the network;
determining, by the processor, whether to respond to the broadcast received by referring to the acceptance weight statistic value shared; and
sending, by the processor, a response to the one of the plurality of external systems that has transmitted the broadcast in order to allow the one of the plurality of external systems to transmit a processing request in a case where it is determined to respond to the broadcast received.

10. The load balancing method according to claim 9, further comprising steps of:
receiving, by the processor, the processing request from one of the plurality of external systems;
determining, by the processor, whether to execute processing requested by the processing request;
selecting, by the processor, an alternate computer from the plurality of computers by referring to the acceptance weight statistic value shared on a case where it is determined not to execute the requested processing;
notifying, by the processor, the one of the plurality of external systems that has transmitted the processing request of information on the alternate computer selected; and
notifying, by the processor, the alternate computer selected of information on the one of the plurality of external systems that has transmitted the processing request.

* * * * *